(12) United States Patent
Owen et al.

(10) Patent No.: US 11,353,202 B1
(45) Date of Patent: Jun. 7, 2022

(54) MULTISTATE ENVIRONMENTAL CONTROL SYSTEM AND METHOD

(71) Applicant: SNAPRAYS, LLC, Vineyard, UT (US)

(72) Inventors: D. Scott Owen, Bluffdale, UT (US); Blake M. Hale, West Jordan, UT (US)

(73) Assignee: SnapRays, LLC, Vineyard, UT (US)

( * ) Notice: Subject to any disclaimer, the term of this patent is extended or adjusted under 35 U.S.C. 154(b) by 0 days.

(21) Appl. No.: 16/893,376

(22) Filed: Jun. 4, 2020

Related U.S. Application Data

(60) Provisional application No. 62/856,739, filed on Jun. 4, 2019.

(51) Int. Cl.
| | | |
|---|---|---|
| *F21V 23/04* | (2006.01) | |
| *F21L 4/00* | (2006.01) | |
| *F21V 23/00* | (2015.01) | |
| *H05B 47/10* | (2020.01) | |
| *F21Y 115/10* | (2016.01) | |

(52) U.S. Cl.
CPC ............... *F21V 23/04* (2013.01); *F21L 4/00* (2013.01); *F21V 23/003* (2013.01); *H05B 47/10* (2020.01); *F21Y 2115/10* (2016.08)

(58) Field of Classification Search
CPC .......... F21V 23/04; F21V 23/003; F21L 4/00; H05B 39/02; H05B 39/04; H05B 41/04; H05B 47/10; H05B 47/105; H05B 47/155; H05B 47/165; H05B 47/185
See application file for complete search history.

(56) References Cited

U.S. PATENT DOCUMENTS

| | | | |
|---|---|---|---|
| 2018/0046144 A1* | 2/2018 | Blakeman | ................ G04F 3/06 |
| 2018/0217003 A1* | 8/2018 | Fadell | ................... H05B 47/19 |
| 2019/0261493 A1* | 8/2019 | Dolan | ................ H05B 47/115 |

OTHER PUBLICATIONS

Commercial Electric 6 in. White Integrated LED Recessed Downlight with Nightlight Trim, https://www.amazon.com/Dommercial-Electric-Integrated-Downlight-Nightlight/dp/B07R27YHGP, published at least as early as May 29, 2019 (see date of question on p. 5), accessed Jun. 30, 2020, pp. 1-8.
Dock Socket: Light Socket Mount for Google Home Mini, https://www.amazon.com/Dock-Socket-Light-Mount-Google/dp/B07C687FP9, accessed Jun. 22, 2020, pp. 1-5.
Best Mount for Google Home Mini & Amazon Echo Dot, https://www.youtube.com/watch?v=D9i_HzOi7kc, published Jun. 28, 2018, pp. 1-5, Dock Socket.

(Continued)

*Primary Examiner* — Rajarshi Chakraborty
*Assistant Examiner* — Nathaniel J Lee

(57) ABSTRACT

Systems and methods for using light switches to control lighting and other functions are disclosed. Each switch may be a manual switch that is mounted to a wall. A biasing device may be positioned proximate each switch. When a user moves the switch out of a first position and into a second position or toward a second position, the delivery of household power to one or more light units may be interrupted. However, when the user releases the switch, the biasing device may provide an immediate automatic return of the manual switch to the first position. The resulting short interruption in household power may be used as a signal for controlling operation of the one or more light units and/or other electronic devices installed at one or more lighting sites corresponding to the switch.

16 Claims, 24 Drawing Sheets

(56) References Cited

OTHER PUBLICATIONS

Lithonia Lighting 3000K 6SL RD 07LM 4000K 90CRI MW 6-Inch Dimmable LED Module with Integrated Wireless Speaker, 730 Lumens, 120 Volts, 13 Watts, Wet Listed, Matte White, https://www.amazon.com/Lithonia-Lighting-6SL-07LM-90CRI/dp/B075F4KBJ5/ref=sr_1_3?crid=1C2DZN0U5E4H5&dchild=1&keywords=speaker+downlight&qid=, accessed Jun. 22, 2020, pp. 1-12.

How to Install and Pair LED Bluetooth Downlight Speakers, https://www.youtube.com/watch?v=h1NcVpOPC1o, published Mar. 28, 2018, pp. 1-17, 1000Bulbs.com.

* cited by examiner

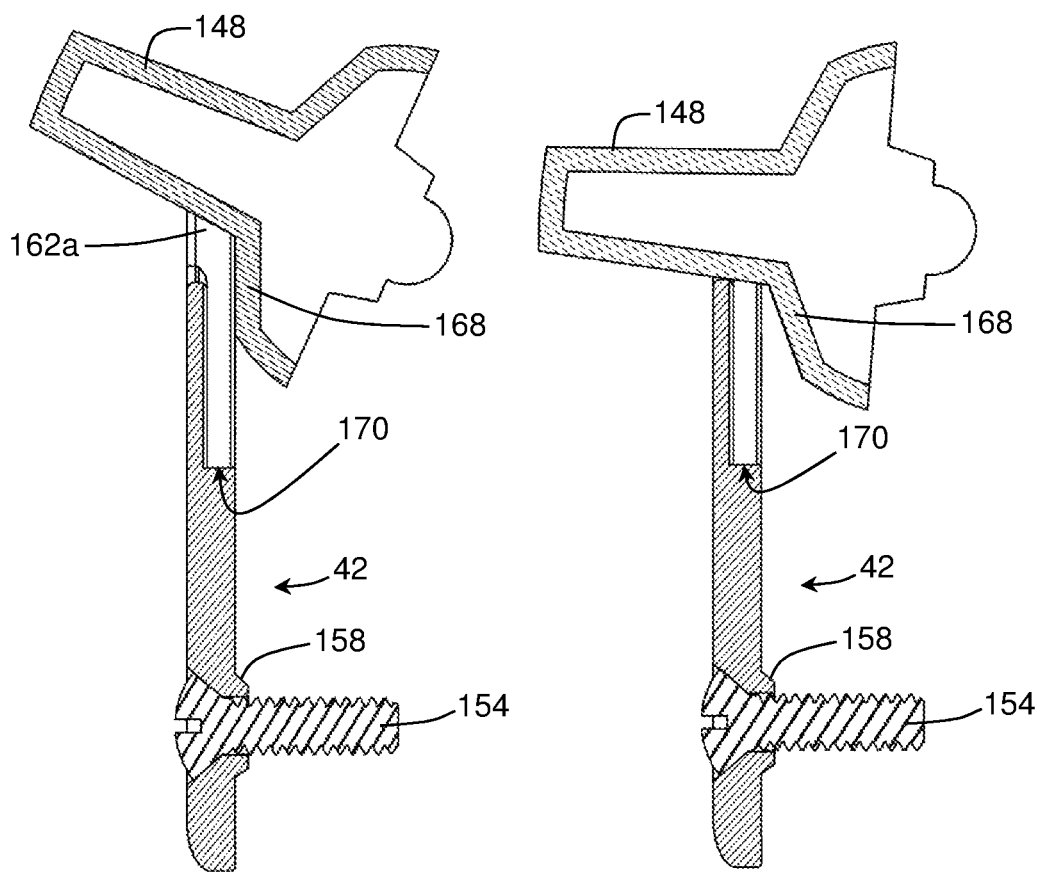
FIG. 21  FIG. 22

MULTISTATE ENVIRONMENTAL CONTROL SYSTEM AND METHOD

RELATED APPLICATIONS

This application claims the benefit of U.S. Provisional Patent Application No. 62/856,739 filed Jun. 4, 2019, which is hereby incorporated by reference.

BACKGROUND

Field of the Invention

This invention relates to electrical systems installed in homes and other buildings and, more particularly, to novel systems and methods for using light switches to control lighting and other functions.

Background Art

Most built-in electronics (e.g., in-ceiling electronic devices) need to be installed by a professional. The installation may be expensive and difficult to change when technology improves or a built-in device breaks. Moreover, in-ceiling electronics typically cannot be taken with an occupant when he or she moves to a new location.

One example of a typical in-ceiling electronic device is a recessed or "can" light. Other in-ceiling devices may include speakers, smoke detectors, and components of security systems. The installation and wiring of such devices is typically best accomplished during construction and not after a location is already built out. Even during construction, however, installation may be difficult due to various structures being in the way of wiring or a mounting structure.

For example, pipes or other structures may interfere with the wiring. Alternatively, or in addition thereto, studs, rafters, joists, or other structures to which electronic devices may be mounted may not be present in the desired locations. This may particularly troublesome for applications where the function of the electronic device depends on the location. For example, the quality of the sound produced by one or more speakers may depend on location and current solutions are difficult to test and move. Accordingly, what is needed are systems and methods that provide greater flexibility in the placement of electronic devices within a building or home, particularly after the building or home has been built out.

BRIEF DESCRIPTION OF THE DRAWINGS

The features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 13 is a schematic plan view of the room of FIG. 12 with all the light emitters corresponding to the units turned ON;

FIG. 21 is a partial side cross-sectional view of the toggle and biasing device of FIG. 18 with the toggle in a first position and the biasing device in a biasing position;

FIG. 22 is another partial side cross-sectional view of the toggle and biasing device of FIG. 18, wherein the toggle has pivot into contact with the biasing device and the biasing device is blocking any further pivoting in that direction;

DETAILED DESCRIPTION OF SELECTED EMBODIMENTS

Figure 1:
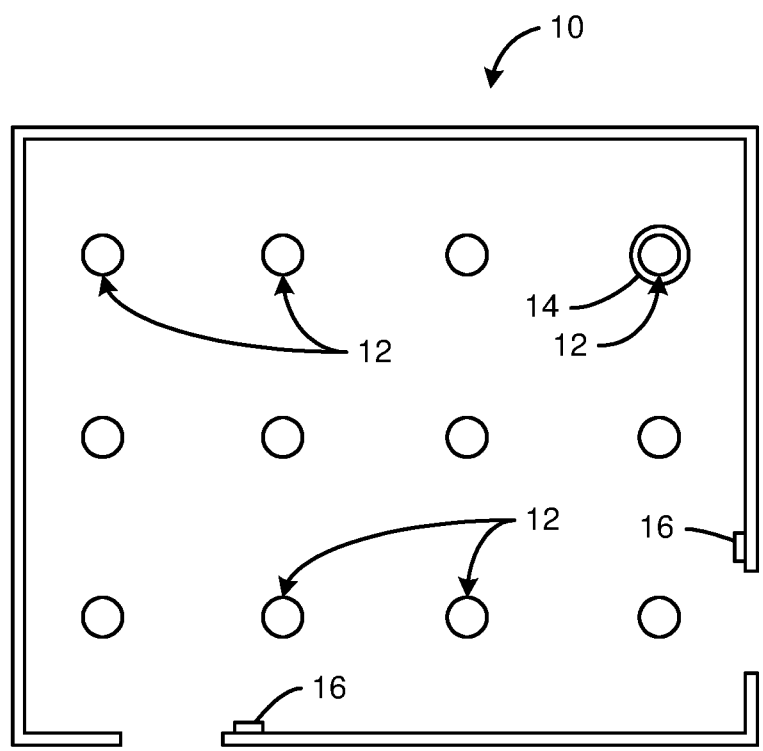
FIG. 1 is a schematic plan view of a room having lighting sites therewithin suitable for receiving multistate light units and/or application units in accordance with the present invention.

It will be readily understood that the components of the present invention, as generally described and illustrated in the drawings herein, could be arranged and designed in a wide variety of different configurations. Thus, the following detailed description of selected embodiments of the system and method of the present invention, as represented in the drawings, is not intended to limit the scope of the invention as claimed, but is merely representative of various embodiments of the invention. The illustrated embodiments of the invention will be best understood by reference to the drawings, wherein like parts are designated by like numerals throughout.

Referring to FIG. 1, a room 10 (e.g., a bedroom, living room, kitchen, bathroom, garage, closet, hallway, office, conference room, showroom, patio, deck, outdoor living space, or other space within or associated with a home or other building) may have multiple lighting sites 12 installed therewithin during a construction process. A lighting site 12 may be a structure (e.g., a connection box, wall box, ceiling box, recessed lighting housing or "can," switched power outlet, or the like) that has been wired to receive "household" power (e.g., grid power or other primary electrical power for a home or other building). Accordingly, a lighting site 12 may have the mechanical structure and/or electrical power needed to support a light.

In a typical or initial build out, a light fixture may be installed at every lighting site 12 within a room 10. For example, if a room 10 were to include a two-dimensional array of twelve lighting sites 12, twelve light fixtures would typically or initially be installed with one lighting fixture at each lighting site 12. However, in selected embodiments in accordance with the present invention, one or more application units 14 may respectively be installed at one or more lighting sites 12. Installation of an application unit 14 may be a retrofit. Accordingly, installation of an application unit 14 may comprise removing a lighting fixture from a lighting site 12 and installing the application unit 14 in its place.

An application unit 14 in accordance with the present invention may be an electrical device having functionality other than or that extends beyond emitting light. For example, an application unit 14 may be or include a speaker and/or microphone. Accordingly, an application unit 14 may be or include a virtual assistant. Alternatively, or in addition thereto, an application unit 14 may be or include a wireless protocol repeater, video projector, smoke detector, heat detector, motion detector, security camera, baby monitor, oil diffuser, wireless charging transmitter, or other electronic device.

Due to the number and distribution of lighting sites 12 within a room 10, an occupant or user of the room 10 may have a variety of options when choosing where to install an application unit 14. Moreover, each lighting site 12 may already have household power delivered thereto. Accordingly, the effort and/or skill required to install an application unit 14 at a selected lighting site 12 may be sufficiently low that a user or occupant of a room 10 may accomplish the task without professional assistance.

An application unit 14 may be modular and configured to interface with electrical and/or mechanical structures typically found at a lighting site 12. For example, an application unit 14 may be sized and shaped to fit within and/or engage a five or six inch recessed lighting housing and/or include an electrical connector for extending and engaging an Edison screw connector (e.g., an E26 receptacle). A modular design may enable simple upgrades (e.g., a simple replacement of a light fixture with an application unit 14) without requiring replacement, modification, or rewiring of a lighting site 12.

The delivery of household power to one or more lighting sites 12 may be controlled by one or more switches 16. Such switches 16 may enable an occupant or user of a room 10 to turn the lights (e.g., one or more light emitters corresponding to one or more light fixtures installed at one or more lighting sites 12) within the room 10 ON and OFF as desired. For example, in a typical room 10, a switch 16 may be connected to household power. In the United States, household power is typically 120V and on a 15 or 20 amp circuit. When the switch 16 is in the OFF position, the light fixtures and one or more application units 14 installed at one or more lighting sites 12 do not have access to household power. When the switch 16 is in the ON position, household power passes through the switch 16 and is available to the light fixtures and to the one or more application units 14.

Figure 2:
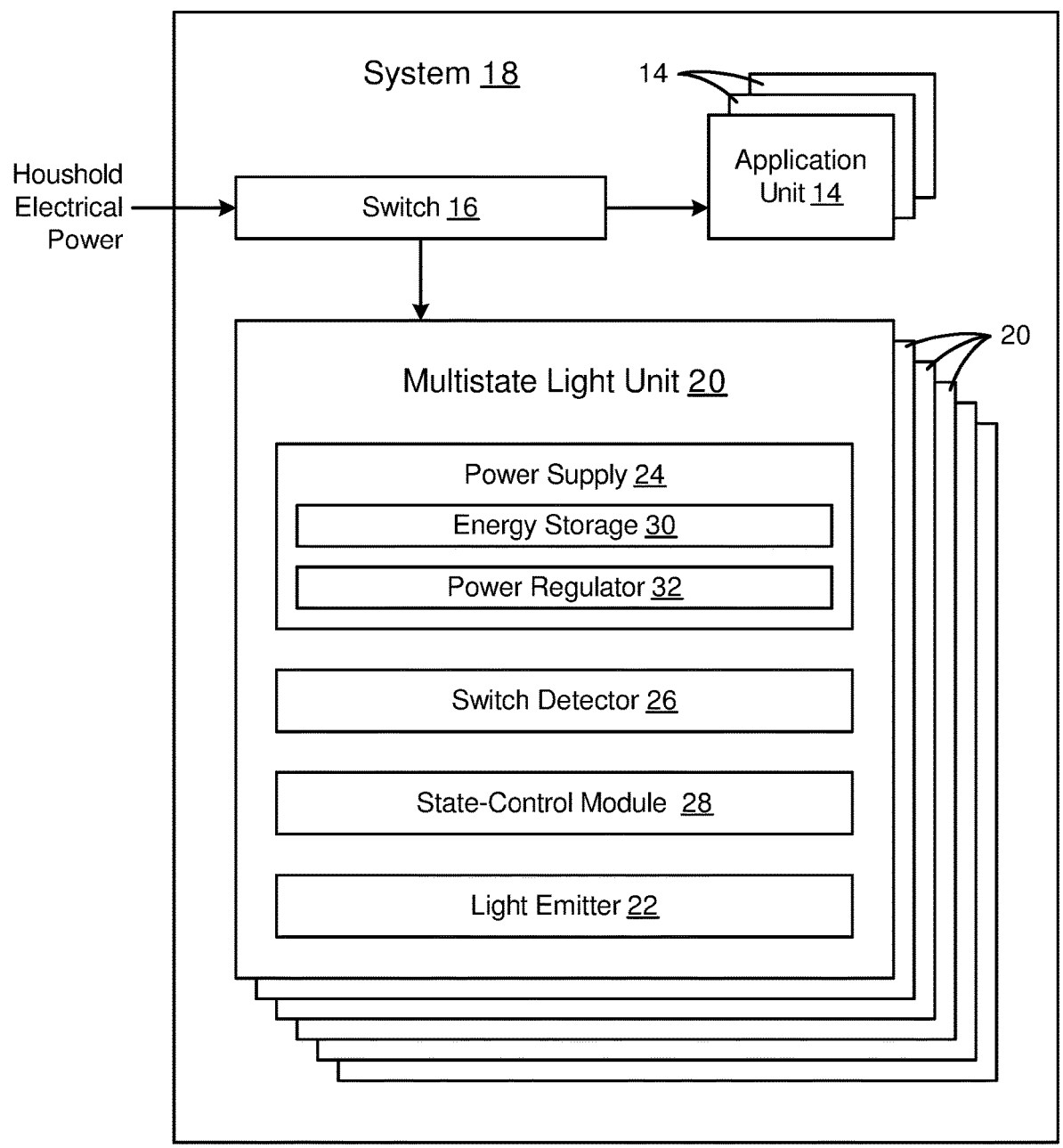
FIG. 2 is a schematic block diagram of one embodiment of a system in accordance with the present invention.

Referring to FIG. 2, for the light fixtures within a room 10, an interruption of household power caused by actuation of a switch 16 may be exactly what is desired by the occupant or user. However, an interruption of power may not be desired for the one or more application units 14 installed within the room 10. That is, an application unit 14 may require continuous power to perform as desired. Systems 18 in accordance with the present invention may overcome this challenge in a variety of ways.

For example, in selected embodiments, a system 18 may include one or more switches 16 that control delivery of household power to one or more application units 14 and one or more multistate light units 20 corresponding to a room 10 or other space within a home or building. The one or more multistate light units 20 may be installed within one or more light fixtures within the room 10. In operation, a multistate light unit 20 may interpret a user toggling a switch 16 OFF and then back ON in some predetermined pattern as an instruction to take some predetermined action. In one example, a user may toggle a switch 16 OFF then ON and, by doing so, signal to a multistate light unit 20 that a light emitter 22 corresponding thereto should be turned OFF. Accordingly, the multistate light unit 20 may turn the light emitter 22 OFF and keep it that way, even when household power is available at the multistate light unit 20. This may enable the light emitter 22 to be turned OFF while minimizing the amount of time one or more corresponding application units 14 (e.g., one or more application units 14 corresponding to the same switch 16 or switches 16) are disconnected from household power.

In selected embodiments, a multistate light unit 20 may include a power supply 24, switch detector 26, state-control module 28, light emitter 22, or the like or a combination or sub-combination thereof. A power supply 24 may supply properly conditioned electrical power to one or more other components of a multistate light unit 20. For example, in certain embodiments, a power supply 24 may supply properly conditioned electrical power to a state-control module 28.

In selected embodiments, a power supply 24 may include one or more energy-storage devices 30, a power regulator 32, or the like or a combination thereof. An energy-storage device 30 may comprise one or more capacitors, super capacitors, ultra-capacitors, batteries, or the like and enable one or more components of a multistate light unit 20 to continue to function as desired during a period of time when the multistate light unit 20 does not have access to household power.

In certain embodiments, an energy-storage device 30 may enable a state-control module 28 to function continuously as a user toggles a switch 16 OFF and ON in some predetermined pattern. Accordingly, with uninterrupted power, a state-control module 28 may monitor and/or interpret that pattern and respond appropriately. An energy-storage device 30 may recharge as needed whenever household power is available.

In selected embodiments, an energy-storage device 30 may be sized to support a reset function. For example, an energy-storage device 30 may be sized to power a state-control module 28 through a first interruption (e.g., a five second interruption) in household power, but not a second, longer interruption (e.g., a ten second interruption) in household power. Accordingly, a state-control module 28 may have sufficient power to monitor and/or interpret normal ON/OFF patterns and respond appropriately. However, in the event of a longer interruption (e.g., an interruption in household power that extends longer than ten seconds), a state-control module 28 may consume all stored electrical power available to it and then cease to operate. When household power is again available, a state-control module 28 may startup in a predetermined initial or home state. Accordingly, running dry on stored power may function as a reset for a state-control module 28.

A power regulator 32 may convert household power (e.g., alternating current at 120V) to low voltage direct current suitable for powering a state-control module 28 or the like. Alternatively, or in addition thereto, a power regulator 32 may condition electrical power supplied thereto by an energy-storage device 30 so that it is suitable for powering a state-control module 28 or the like. For example, in selected embodiments, a power regulator 32 may reduce a voltage of electrical power supplied thereto by an energy-storage device 30 comprising one or more capacitors so that it is suitable for powering a state-control module 28.

A switch detector 26 may send one or more signals to a state-control module 28 indicating whether a switch 16 is ON or OFF (i.e., whether a corresponding multistate light unit 20 has access to household power). For example, a switch detector 26 may send a first signal to a state-control module 28 (e.g., set a flag at a first or "true" value) when household power is available at the multistate light unit 20 and send a second signal to a state-control module 28 (e.g., set the flag to a second or "false" value) when household power is not available at the multistate light unit 20.

A state-control module 28 may be configured in any of a number of ways to retain a state of a corresponding multistate light unit 20. A state-control module 28 may receive an input that influences the state of a multistate light unit 20 and change (or signal a change) in that state. In certain embodiments, a state-control module 28 may retain a state of a multistate light unit 20 as long as the state-control module 28 has properly conditioned electrical power supplied thereto.

Memory of a state-control module 28 may be digital or analog. In certain embodiments, a state-control module 28 may have memory in the form of a flip flop. In other embodiments, a state-control module 28 may retain a state in nonvolatile or volatile memory, a latching relay, a latching circuit (SRlatch), toggle flip flops, JK flip flops, a shift register, or any other memory that holds state.

In selected embodiments, a state-control module 28 may comprise a microprocessor. For example, a state-control module 28 may comprise a microprocessor that retains a current state, alternates to another state when appropriate, and the like. In selected embodiments, a state-control module 28 may comprise a microprocessor operating in conjunction with a relay, MOSFET, bipolar junction transistor (BJT), or the like to control or switch an electrical connection between a light emitter 22 and household power.

Figure 3:
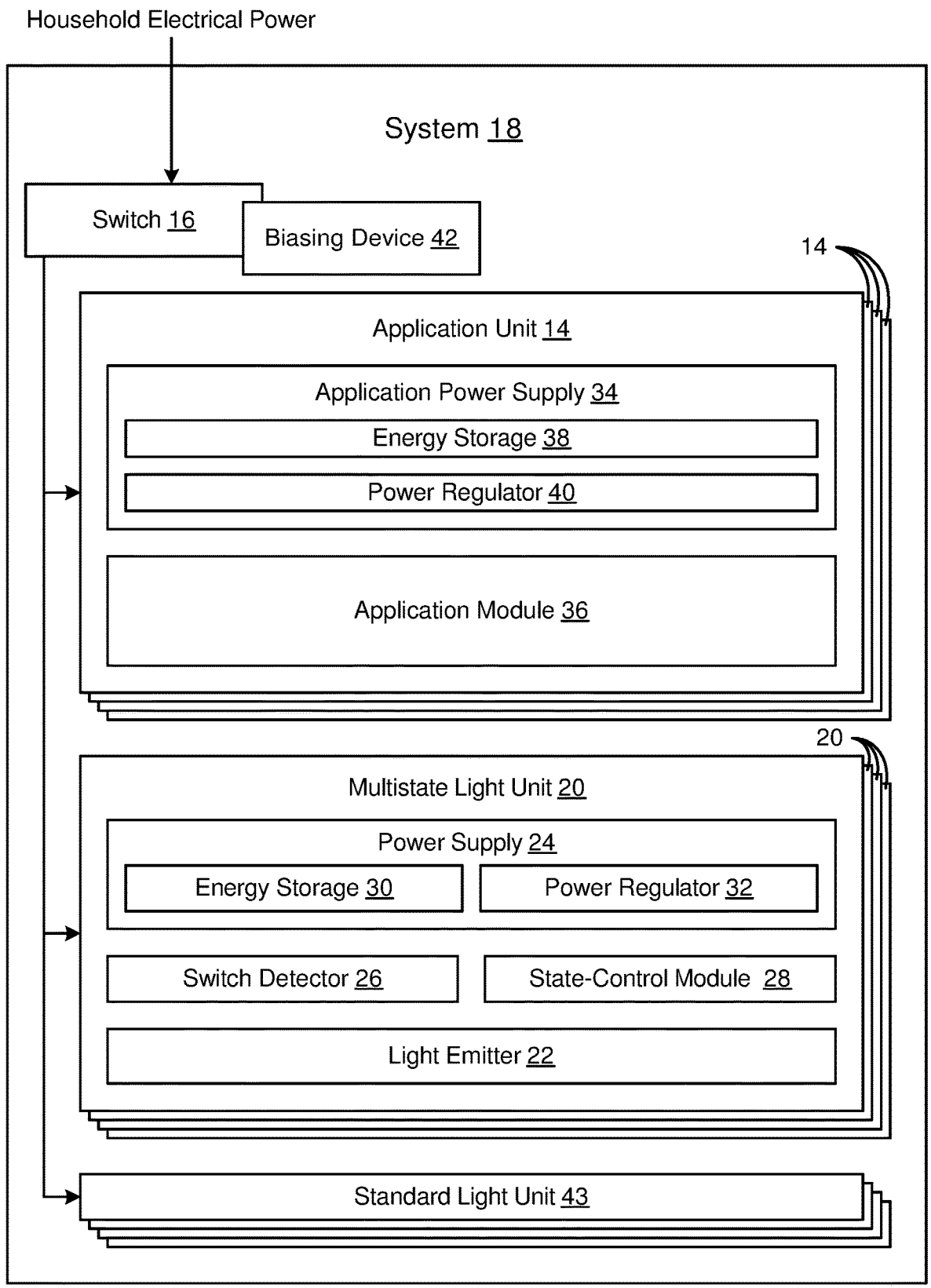
FIG. 3 is a schematic block diagram of an alternative embodiment of a system in accordance with the present invention.

Referring to FIG. 3, in certain embodiments, an application unit 14 may include an application power supply 34 and an application module 36. An application power supply 34 may supply properly conditioned electrical power to an application module 36.

In selected embodiments, an application power supply 34 may include one or more energy-storage devices 38, a power regulator 40, or the like or a combination thereof. An energy-storage device 38 may comprise one or more capacitors, super capacitors, ultra-capacitors, batteries, or the like and enable an application module 36 to continue to function as desired during a period of time when the application unit 14 does not have access to household power. In certain embodiments, an energy-storage device 38 may enable an application module 36 to function continuously for a relatively short period of time as a user toggles a switch 16 OFF and ON in some predetermined pattern. In other embodiments, one or more energy-storage devices 38 may provide electrical power to one or more components of an application unit 14 for a much longer period of time. In either case, one or more energy-storage devices 38 may recharge whenever household power is available.

In selected embodiments, an energy-storage device 38 may be sized to support a reset function. For example, an energy-storage device 38 may be sized to power an application module 36 through a first interruption (e.g., a five second interruption) in household power, but not a second, longer interruption (e.g., a ten second interruption) in household power. Accordingly, an application module 36 may have sufficient power to function as desired across normal ON/OFF patterns. However, in the event of a longer interruption (e.g., an interruption in household power that extends longer than ten seconds), an application module 36 may consume all stored electrical power available to it and then cease to operate. When household power is again available, an application module 36 may startup in a predetermined initial or home state. Accordingly, running dry on stored power may function as a reset for an application module 36.

A power regulator 40 may convert household power (e.g., alternating current at 120V) to low voltage direct current suitable for powering an application module 36. Alternatively, or in addition thereto, a power regulator 40 may condition electrical power supplied thereto by an energy-storage device 38 so that it is suitable for powering an application module 36. For example, in selected embodiments, a power regulator 40 may reduce a voltage of electrical power supplied thereto by an energy-storage device 38 comprising one or more capacitors so that it is suitable for powering an application module 36.

An application module 36 may provide the primary or a core functionality of an application unit 14. That is, an application module 36 may provide the functionality driving an occupant's or user's decision to install an application unit 14. In certain embodiments, an application module 36 may include hardware and/or software that provides functionality that is different from emitting light. For example, an application module 36 may be or include a speaker and/or microphone. Accordingly, an application module 36 may be or include a virtual assistant. Alternatively, or in addition thereto, an application module 36 may be or include a wireless protocol repeater, video projector, smoke detector, heat detector, motion detector, security camera, baby monitor, oil diffuser, wireless charging transmitter, or the like. In other embodiments, an application module 36 may be some other kind of electrical device or provide some other kind of functionality. Accordingly, the functionality incorporated within an application module 36 in accordance with the present invention may be extensive and/or varied from embodiment to embodiment.

A system 18 may include one or more biasing devices 42. In certain embodiments, a system 18 may include one biasing device 42 for each switch 16 within the system 18. A biasing device 42 may be or include a structure that biases a corresponding switch 16 to a particular position. For example, a biasing device 42 may be positioned to bias a switch 16 (e.g., a toggle switch, decora switch, or the like) toward an ON position. Accordingly, in operation, a human user may be free to move a switch 16 out of an ON position and into an OFF position or toward an OFF position. However, when the user releases the switch 16, the biasing device 42 may effect, provide, or enable a rapid (e.g., immediate) automatic return of the switch 16 to the ON position. As a result, a biasing device 42 may ensure that household power is promptly restored to one or more application units 14 corresponding to the switch 16.

In selected embodiments, a system 18 in accordance with the present invention may include one or more standard light units 43 (e.g., standard light bulbs, Light emitting diodes with standard connection interfaces, or the like). Such units 43 may emit light when they are connected to household power and stop emitting light when they are not connected to household power. In certain embodiments, one or more standard light units 43 may provide security lighting, safety lighting, scene lighting, or the like.

Figure 4:
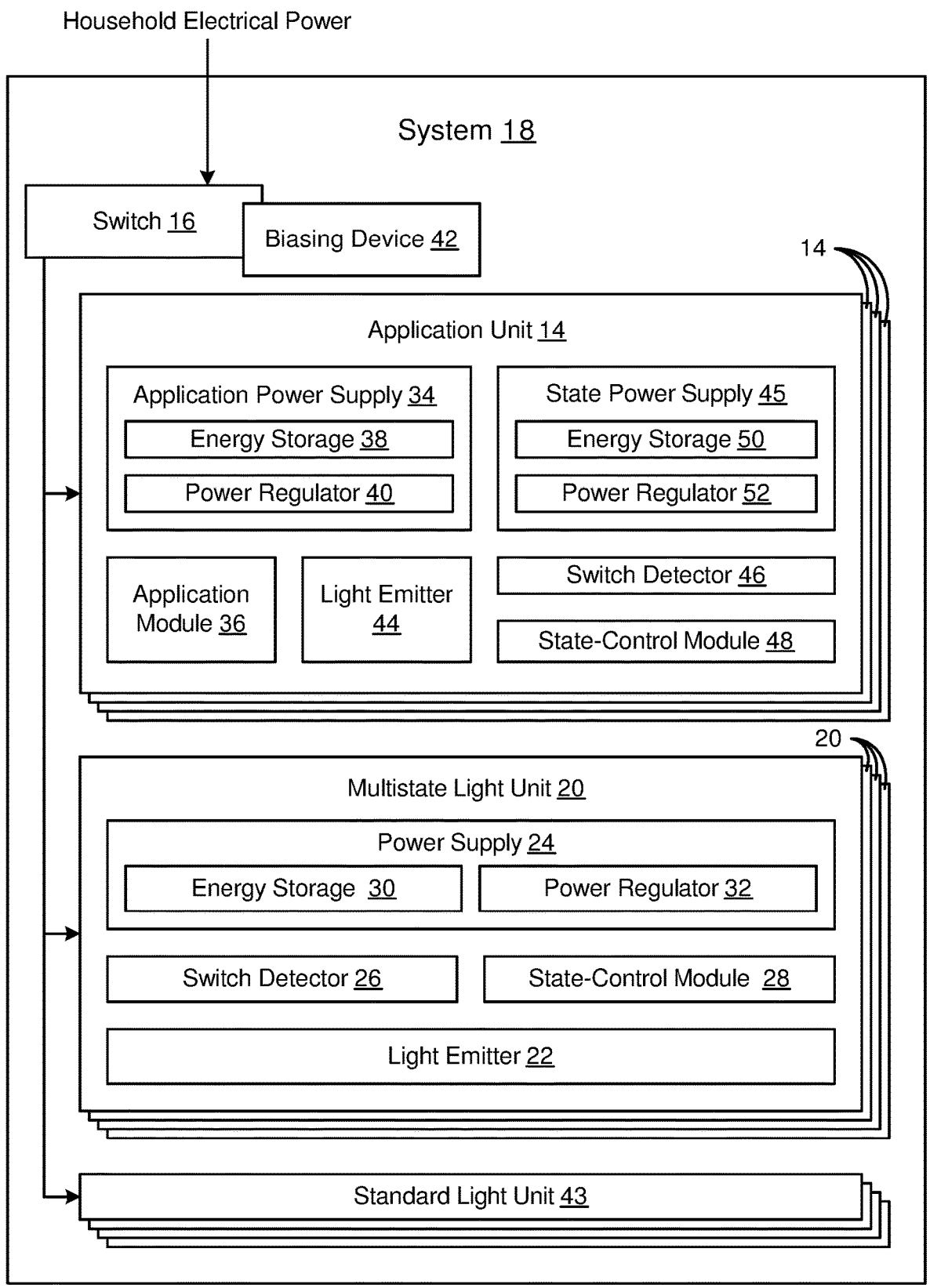
FIG. 4 is a schematic block diagram of another alternative embodiment of a system in accordance with the present invention.

Referring to FIG. 4, in selected embodiments, an application unit 14 may interpret a user toggling a switch 16 OFF and then back ON in some predetermined pattern as an instruction to take some predetermined action. For example, an application unit 14 may include a light emitter 44. Thus, in addition to having the functionality associated with an application module 36, an application unit 14 may provide lighting. To control the operation of a light emitter 44, an application unit 14 may be configured like a multistate light unit 20. Accordingly, like a multistate light unit 20, an application unit 14 may interpret a user toggling a switch 16 OFF and then back ON as an instruction to turn a light emitter 44 OFF or ON, depending on its initial or previous state. Thus, in certain embodiments, an application unit 14 may be configured or viewed as a multistate light unit 20 with an application power supply 34 and an application module 36 added thereto.

Alternatively, or in addition thereto, an application unit 14 may interpret a user toggling a switch 16 OFF and then back ON in some predetermined pattern as an instruction to take some predetermined action with respect to the functionality of an application module 36. For example, a user may toggle a switch 16 OFF then ON in a selected number of cycles (e.g., two cycles) to signal to an application module 36 comprising a security camera to start (or end) a motion-activated recording mode (e.g., an "away" mode). In another example, a user may toggle a switch 16 OFF then ON in a selected number of cycles to signal to an application module 36 comprising an oil diffuser to start (or end) an diffusion process (e.g., to turn the diffuser ON or to turn the diffuse OFF). In another example, a user may toggle a switch 16 OFF then ON in a selected number of cycles to turn an application module 36 comprising a virtual assistant OFF (or ON) and, thereby, control when the virtual assistant is monitoring voice activity. In certain embodiments, a cycle may comprise (1) a user moving a switch 16 out of an ON position and into an OFF position or toward an OFF position, (2) the user releasing the switch 16, and (3) a biasing device 42 providing an immediate automatic return of the switch 16 to the ON position. Accordingly, a cycle may be accomplished quickly and easily and resemble, from the perspective of a user, a push of a button.

When controlling a lighting functionality associated therewith (e.g., controlling a light emitter 44), an application unit 14 may look for and/or respond to the same cycle pattern as a multistate light unit 20. However, when controlling other functionality (e.g., functionality associated with an application module 36), an application unit 14 may look for and/or respond to a different cycle pattern.

For example, in selected embodiments, a multistate light unit 20 may look for and/or respond to a standalone cycle. A standalone cycle may be a single cycle that is separated by a predetermined period of time (e.g., two or more seconds) from any preceding or subsequent cycle. Accordingly, if a multistate light unit 20 detects a standalone cycle, it may turn a corresponding light emitter 22 OFF or ON, depending on its initial or previous state. In contrast, when controlling non-lighting functionality, an application unit 14 may look for and/or respond to a double cycle. A double cycle may occur when two cycles are detected within a predetermined period of time (e.g., within two seconds of each other). Accordingly, in certain embodiments, one or more multistate lights 20 within a system 18 may respond to standalone along cycles and ignore double cycles, while one or more application units 14 within the system 18 may respond to standalone cycles (e.g., use standalone cycles to control the lighting functionality provided by an application unit 14) and respond to double cycles (e.g., use double cycles to control some other functionality provided by an application unit 14). In this manner, lighting functionality associate with one or more light emitters 22, 44 may be controlled independently of functionality associated with an application module 36.

In selected embodiments, an application unit 14 may include a state power supply 45, switch detector 46, state-control module 48, or the like or a combination or subcombination thereof. A state power supply 45 may supply properly conditioned electrical power to a state-control module 48 corresponding to an application unit 14. In certain embodiments, a state power supply 45 and an application power supply 34 may be the same device or they may share certain components, hardware, or the like. Alternatively, a state power supply 45 may be totally independent from an application power supply 34.

In selected embodiments, a state power supply 45 may include one or more energy-storage devices 50, a power regulator 52, or the like or a combination thereof. An energy-storage device 50 may comprise one or more capacitors, super capacitors, ultra-capacitors, batteries, or the like and enable a state-control module 48 of an application unit 14 to function as desired during a period of time when the application unit 12 does not have access to household power.

In certain embodiments, an energy-storage device 50 may enable a state-control module 48 of an application unit 14 to function continuously as a user toggles a switch 16 OFF and ON in some predetermined pattern. Accordingly, with uninterrupted power, a state-control module 48 may monitor and/or interpret that pattern and respond appropriately. An energy-storage device 50 may recharge as needed whenever household power is available. As disclosed hereinabove with respect to other energy-storage devices 30, 38, an energy-storage device 50 corresponding to a state power supply 45 may be sized to support a reset function.

A power regulator 52 may convert household power (e.g., alternating current at 120V) to low voltage direct current suitable for powering a state-control module 48 of an application unit 14. Alternatively, or in addition thereto, a power regulator 52 may condition electrical power supplied thereto by an energy-storage device 50 so that it is suitable for powering a state-control module 48 or the like. For example, in selected embodiments, a power regulator 52 may reduce a voltage of electrical power supplied thereto by an energy-storage device 50 comprising one or more capacitors so that it is suitable for powering a state-control module 48 of an application unit 14.

A switch detector 46 of an application unit 14 may function like a switch detector 26 corresponding to a multistate light unit 20. Accordingly, a switch detector 46 of an application unit 14 may send one or more signals to a state-control module 28 indicating whether a switch 16 is ON or OFF (i.e., whether a corresponding application unit 14 has access to household power). A state-control module 48 of an application unit 14 may be configured (e.g., comprise similar or identical components) and/or function like a state-control module 28 corresponding to a multistate light unit 20. Accordingly, a state-control module 48 of an application unit 14 may receive an input that influences the state of an application module 36, the state of a light emitter 44, or the like and change (or signal a change) in that state. In certain embodiments, a state-control module 48 of an application unit 14 may differ from a state-control module 28 of a multistate light unit 20 only by looking for and/or responding to a different cycle pattern or to more cycle patterns.

Figure 5:
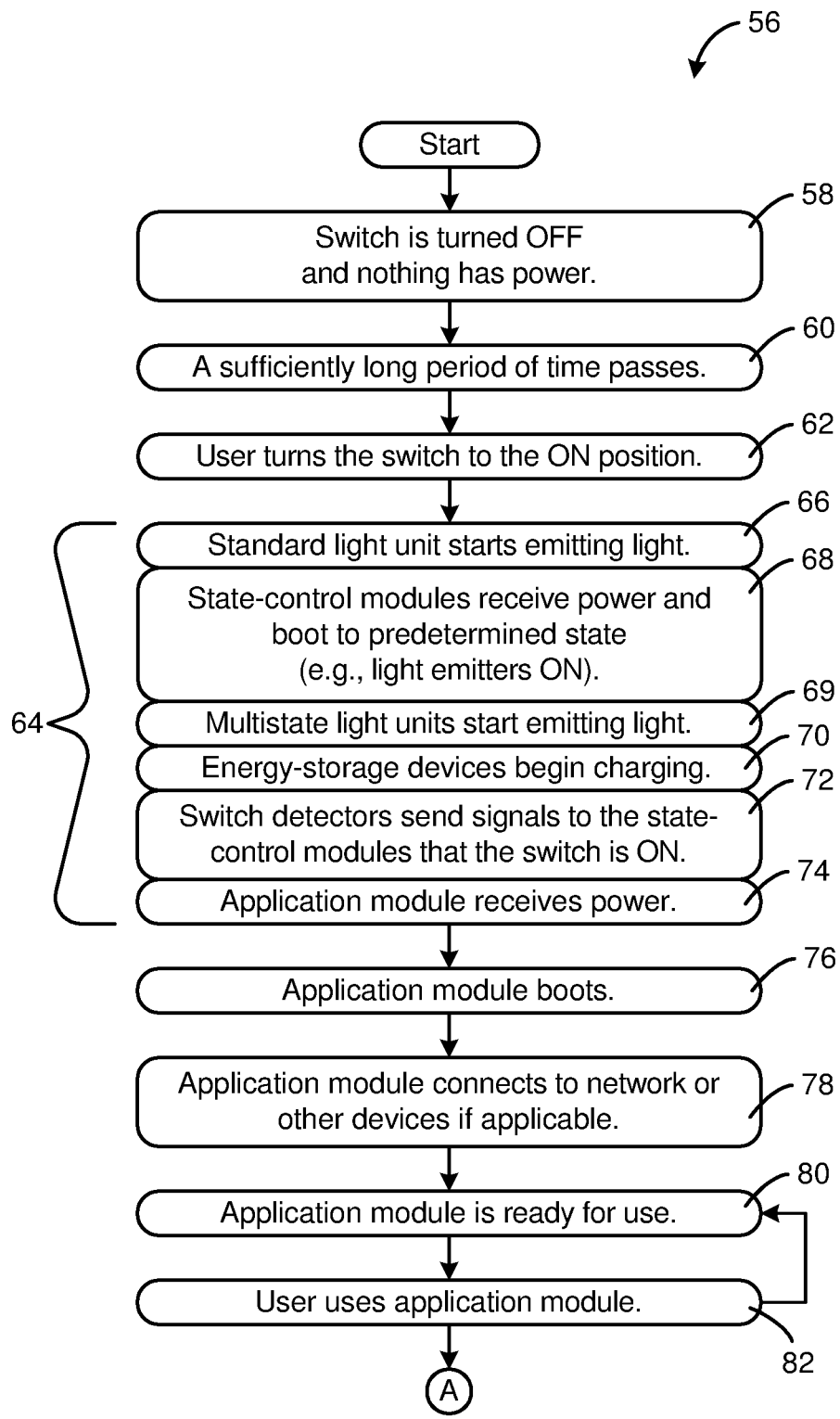
FIG. 5 is a schematic block diagram of a first portion of one embodiment of a method in accordance with the present invention.
Figure 6:
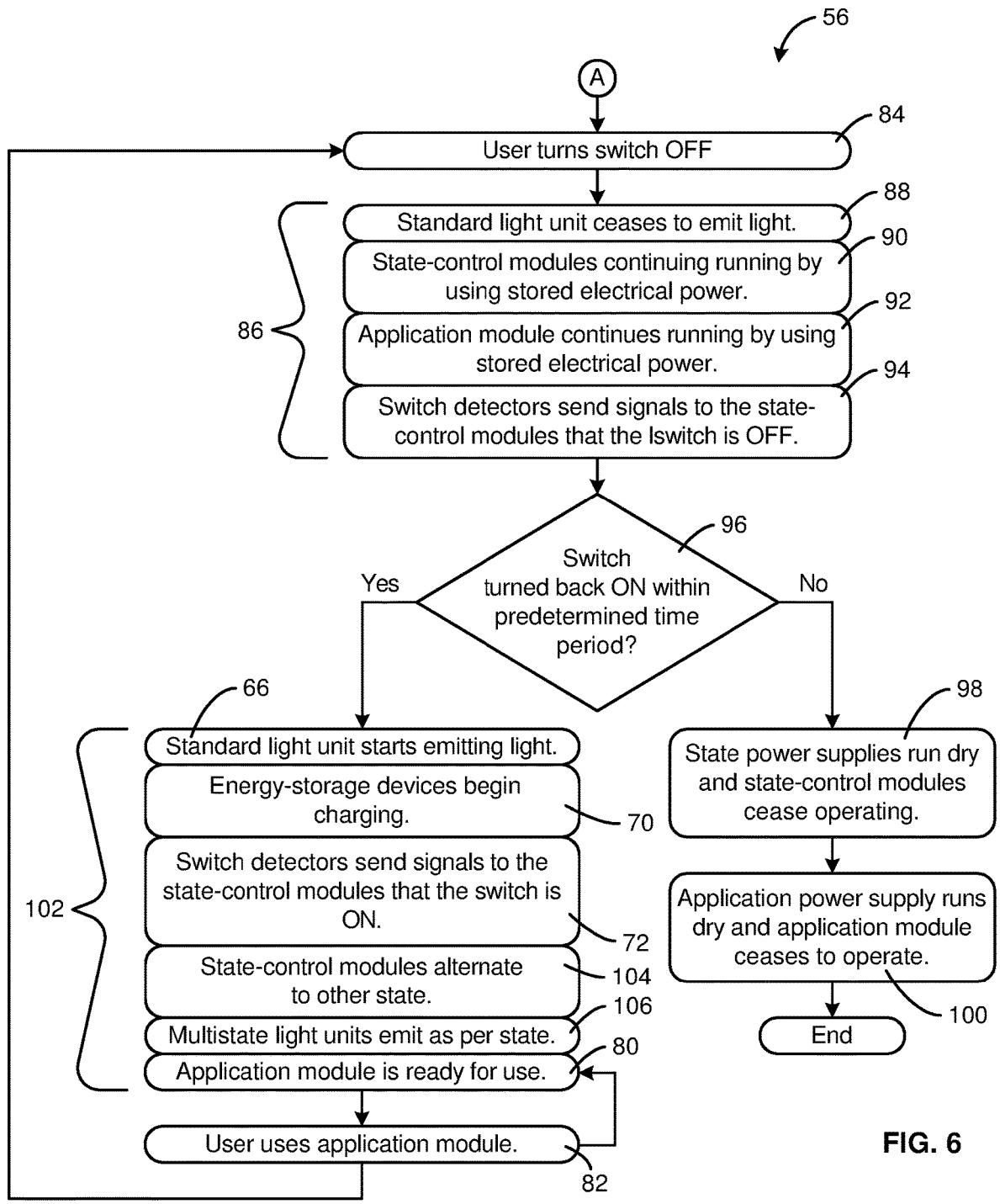
FIG. 6 is a schematic block diagram of a second portion of the method of FIG. 5.

Referring to FIGS. 5 and 6, in certain embodiments, a method 56 in accordance with the present invention may prolong, preserve, or maximize the time over which household power is delivered to an application unit 14 installed at a lighting site 12, while still enabling a user to turn OFF certain light emitters 22, 44 using a switch 16 (e.g., a conventional wall-mounted switch). For purposes of discussion, such a method 56 will be discussed hereinbelow as pertaining to a system 18 like the one illustrated in FIG. 3 and comprising one switch 16, one standard light unit 43, one application unit 14 with an application module 36 forming a virtual assistant, and multiple multistate light units 20. However, a method 56 may be used on or adapted to other systems 18 in accordance with the present invention as desired or necessary.

As a method 56 begins, a system 18 may be in an unpowered condition. For example, a switch 16 may be turned 58 OFF (i.e., be in an OFF position) so that nothing (e.g., no standard light unit 43, multistate light unit 20, or application unit 14) is connected to household power. Additionally, a sufficiently long time may pass 60 with the switch 16 in the OFF position to ensure that all electrical energy stored in the system 18 may be completely consumed and all components (e.g., state-control modules 28, application modules 36) may be unpowered. In selected embodiments, a sufficiently long period of time may comprise about 30 seconds.

At some point thereafter, a user may turn 62 the switch 16 to an ON position. This may result in multiple steps 64 being performed in rapid succession, simultaneously, or some combination thereof. Accordingly, the order of the steps 64 shown in FIG. 5 is merely illustrative. The steps 64 may include: (1) the standard light unit 43 starting 66 to emit light; (2) the state-control modules 28 of the various multistate light units 20 receiving 68 power and loading, booting, or initializing to predetermined states (e.g., a state corresponding to light emitters 22 being connected to household power and emitting light); (3) the multistate light units 20 (e.g., the light emitters 22 of the multistate light units 20) starting 69 to emit light; (4) the energy-storage devices 30, 38 beginning 70 to charge; (5) switch detectors 26 of the various multistate light units 20 sending 72 signals to corresponding state-control modules 28 indicating that the switch 16 is ON (i.e., that household power is available); and (6) an application module 36 of the application unit 14 receiving 74 electrical power.

After receiving 74 electrical power, the application module 36 may boot 76, turn ON, or begin some other startup process. Accordingly, the application module 36 may connect 78 to a network (e.g., connect to a wireless computer network) and/or otherwise ready 80 itself for use. Thereafter, a user may use 82 the application module 36. For example, a user may issue a voice command requesting the application module 36 to play a particular song, playlist, or the like.

At some point thereafter, a user may turn 84 the switch OFF. This may result in multiple steps 86 being performed in rapid succession, simultaneously, or some combination thereof. Accordingly, the order of the steps 86 shown in FIG. 6 is merely illustrative. The steps 86 may include: (1) the standard light unit 43 ceasing 88 to emit light; (2) the state-control modules 28 of the various multistate light units 20 continuing 90 to run by using stored electrical power (e.g., electrical power stored within a corresponding power supply 24); (3) the application module 36 continuing 92 to run by using stored electrical power (e.g., electrical power stored within a corresponding power supply 34); and (4) switch detectors 26 of the various multistate light units 20 sending 94 signals to corresponding state-control modules 28 indicating that the switch 16 is OFF (i.e., that household power is not available).

An intent of the user in turning 84 the switch 16 OFF may be to shut everything down, reset one or more components of a system 18, or the like. Alternatively, the intent may be to turn OFF the various light emitters 22. In selected embodiments, the intent of the user may be inferred based on a determination 96 of whether the user turns the switch 16 back ON in a timely manner (e.g., within a few seconds before all stored energy is consumed). If the switch is not turned back on in a timely manner, the state power supplies 24 of the multistate light units 20 may run 98 "dry" (i.e., run out of stored power) and the corresponding state-control modules 28 may cease operating. The application power supply 34 may also run 100 dry and the application module 36 may cease operating. Accordingly, if the switch 16 is not turned back on in a timely manner, as system 18 may return to an unpowered condition.

On the other hand, if the switch 16 is turned back on in a timely manner, multiple steps 102 may be performed in rapid succession, simultaneously, or some combination thereof. Accordingly, the order of the steps 102 shown in FIG. 6 is merely illustrative. The steps 102 may include: (1) the standard light unit 43 starting 66 to emit light; (2) the energy-storage devices 30, 38 beginning 70 to charge; (3) switch detectors 26 of the various multistate light units 20 sending 72 signals to corresponding state-control modules 28 indicating that the switch 16 is ON (i.e., that household power is available); (4) the state-control modules 28 of the various multistate light units 20 alternating 104 to the other state; (5) the multistate light units 20 (e.g., the light emitters 22 of the multistate light units 20) emitting 106 in accordance with the state stored within the state-control modules 28; and (6) an application module 36 of the application unit 14 continuing 80 to be ready for use.

In selected embodiments, alternating 104 to the other state may be a switch to the other of two alternative states. For example, if a current state stored within a state-control module corresponds to "light emitters OFF," then alternating 104 to the other state may change the stored state to "light emitters ON." In such situations, emitting 106 in accordance with the state would result in the multistate light units 20 emitting light. Conversely, if a current state stored within a state-control module corresponds to "light emitters ON," then alternating 104 to the other state may change the stored state to "light emitters OFF." In such situations, emitting 106 in accordance with the state would result in the multistate light units 20 ceasing to emitting light. Accordingly, repeatedly looping within the method 56 back to turning 84 the switch OFF and then turning the switch 16 back on in a timely manner may alternate the multistate light units 20 between emitting light and not emitting light.

The foregoing method 56 may be adapted to a system 18 like the one illustrated in FIG. 4. For example, in selected embodiments, the state power supply 45, switch detector 46, state-control module 48, and light emitter 44 of an application unit 14 may respectively function just like the power supply 24, switch detector 26, state-control module 28, and light emitter 22 of a multistate light unit 20. Accordingly, the light emitter 44 associated with an application unit 14 may turn ON and OFF in unison with the light emitters 22 of the various multistate light units 20 of the system 18. In certain such embodiments, no control of an application module 36 may be exerted by a user via a switch 16 other than a total denial of household power that would eventually produce a shutdown of the application module 36 when one or more energy-storage devices 38 associated therewith run dry. In selected embodiments, such running dry may occur within a few seconds (e.g., a time within the range from about 3 seconds to about 30 seconds).

Figure 7:
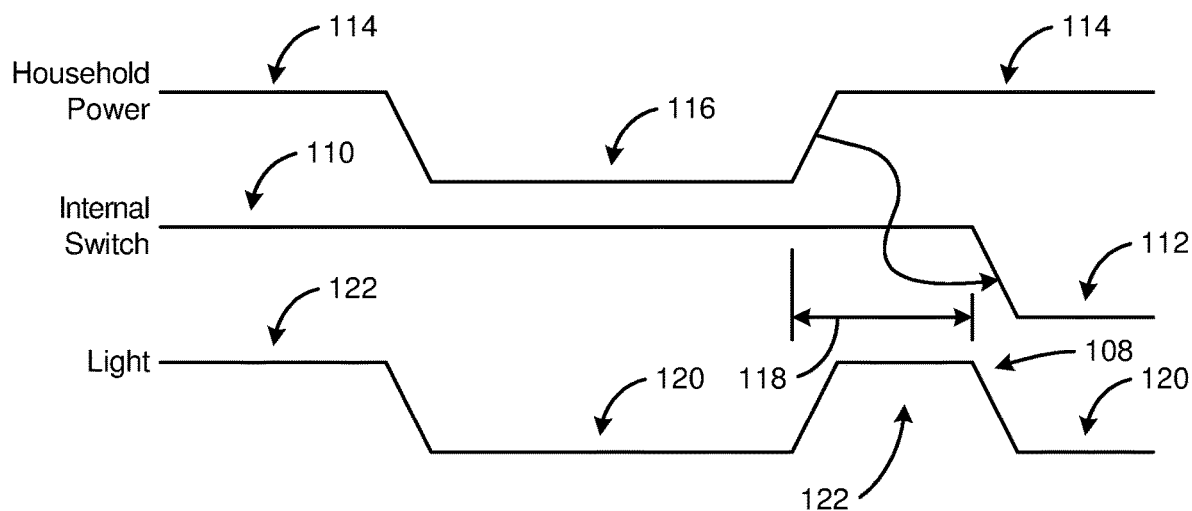
FIG. 7 is a schematic diagram illustrating a light-flash problem that may occur in certain circumstances.
Figure 8:
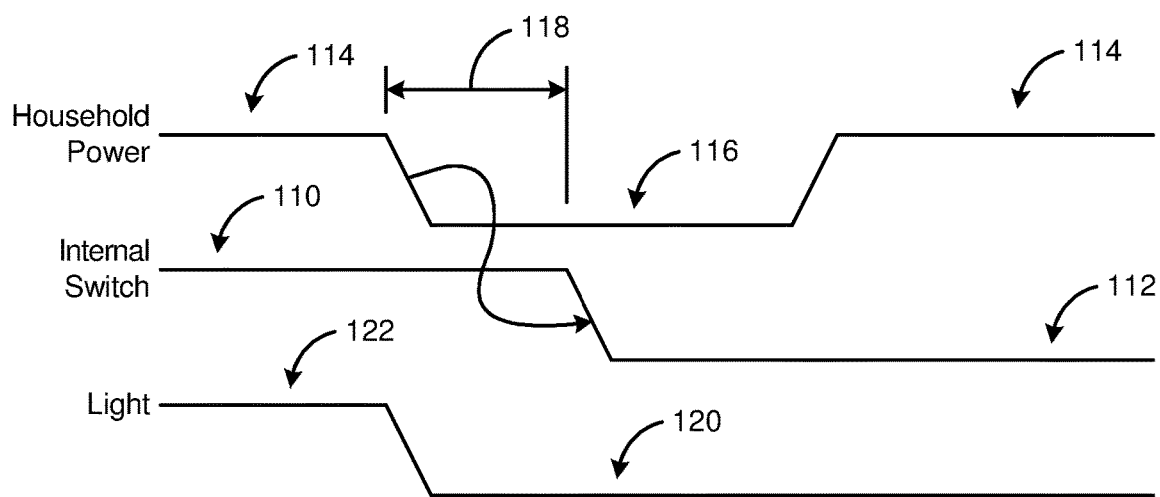
FIG. 8 is a schematic diagram illustrating one embodiment of a solution to the light-flash problem of FIG. 7.

Referring to FIGS. 7 and 8, the various electrical connections of one or more light emitters 22, 44 to household power may be controlled by one or more corresponding state-control modules 28, 48. In selected embodiments, each state-control module 28, 48 within a system 18 may be an "internal switch" comprising a microprocessor operating in conjunction with a relay, MOSFET, bipolar junction transistor (BJT), or the like. Accordingly, the internal switch provided by one or more state-control modules 28, 48 may selectively connect/disconnect one or more corresponding light emitters 22, 44 to/from household power.

In selected embodiments, to avoid an unwanted flash 108 of light, one or more state-control modules 28, 48 may act in certain circumstances to disconnect their respective internal switches (i.e., transition from a connected condition 110 to a disconnected condition 112) based on a falling edge of household power (i.e., based on household power transition from an ON condition 114 to an OFF condition 116) rather than a rising edge of household power (i.e., based on household power transition from an OFF condition 116 to an ON condition 114).

The internal switching performed by one or more state-control modules 28, 48 may not be instantaneous. It may require some time 118 (e.g., some fraction of a second) for the one or more state-control modules 28, 48 to see that household power has been restored and then react and disconnect their respective internal switches. In certain circumstances (i.e., the circumstances illustrated in FIG. 7), this delay 118 may result in one or more light emitters 22, 44 emitting a flash 108 of light (i.e., transitioning rapidly from an OFF condition 120 to an ON condition 122 and then back to an OFF condition 120).

For example, initially, household power may be in an ON condition 114, one or more internal switches may be in a connected condition 110, and one or more light emitters 22, 44, may be in an ON condition 122. A user may then turn 84 a switch 16 OFF and transition household power to an OFF condition 116. The one or more light emitters 22, 44 may react to this cut in power by transitioning from an ON condition 122 to an OFF condition 120. If the one or more state-control modules 28, 38 were disconnecting their respective internal switches based on a rising edge of household power, they would be doing nothing at this point because there has been no rising edge. Accordingly, their internal switches would remain in a connected condition 110. As a result, when the household power is restored (i.e., transitioned from an OFF condition 116 to an ON condition 114), the one or more light emitters 22, 44 are still connected and can rapidly begin to emit light. Accordingly, the one or more light emitters 22, 44 may begin emitting light before the one or more state-control modules 28, 48 can see that household power has been restored and react by disconnecting their respective internal switches. The one or more light emitters 22, 44 may emit light for a short period of time until they are disconnected by the one or more state-control modules 28, 38.

In the same circumstances, disconnecting respective internal switches based on a falling edge of household power as shown in FIG. 8 may avoid the possibility of a flash 108. For example, initially, household power may be in an ON condition 114, one or more internal switches may be in a connected condition 110, and one or more light emitters 22, 44, may be in an ON condition 122. A user may then turn 84 a switch 16 OFF and transition household power to an OFF condition 116. The one or more light emitters 22, 44 may react to this cut in power by transitioning from an ON condition 122 to an OFF condition 120. The one or more state-control modules 28, 38 may see that household power has been cut off and react by disconnecting their respective internal switches. Accordingly, regardless of whether the user chooses to rapidly restore household power, the one or more light emitters 22, 44 will already have been disconnected from household power. That is, the reaction time 118 of the one or more state-control modules 28, 38 may be significantly faster than those of a user operating a switch 16, even when that switch 16 is coupled with a biasing device 42. Given the initial conditions (i.e., light emitters were ON) and the action 84 of the user (i.e., the user turned 84 the switch 16 OFF), this disconnection is a desired and not a logically unreasonable result.

Figure 9:
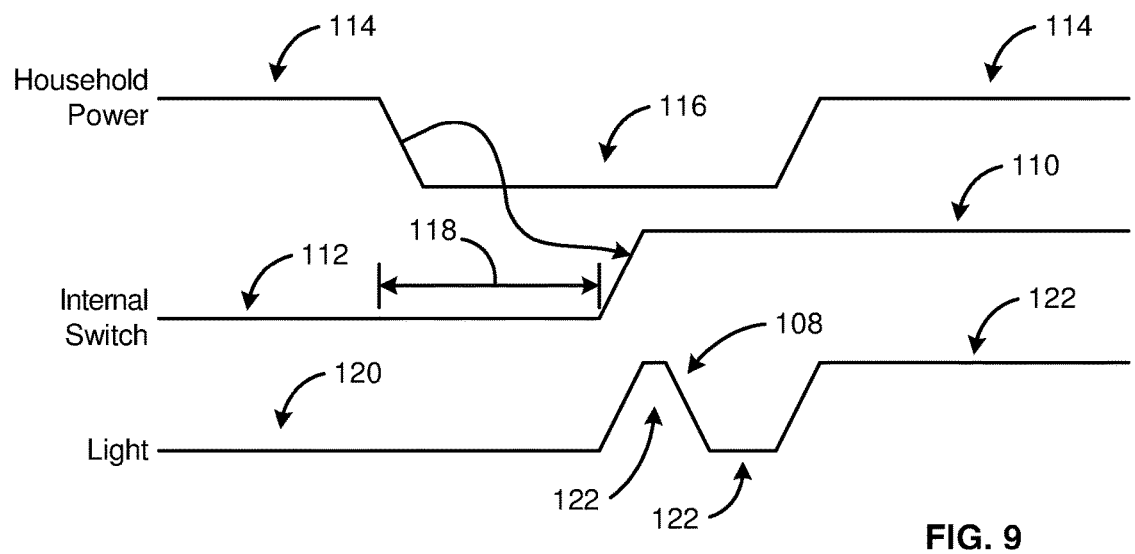
FIG. 9 is a schematic diagram illustrating another light-flash problem that may occur in certain circumstances.
Figure 10:
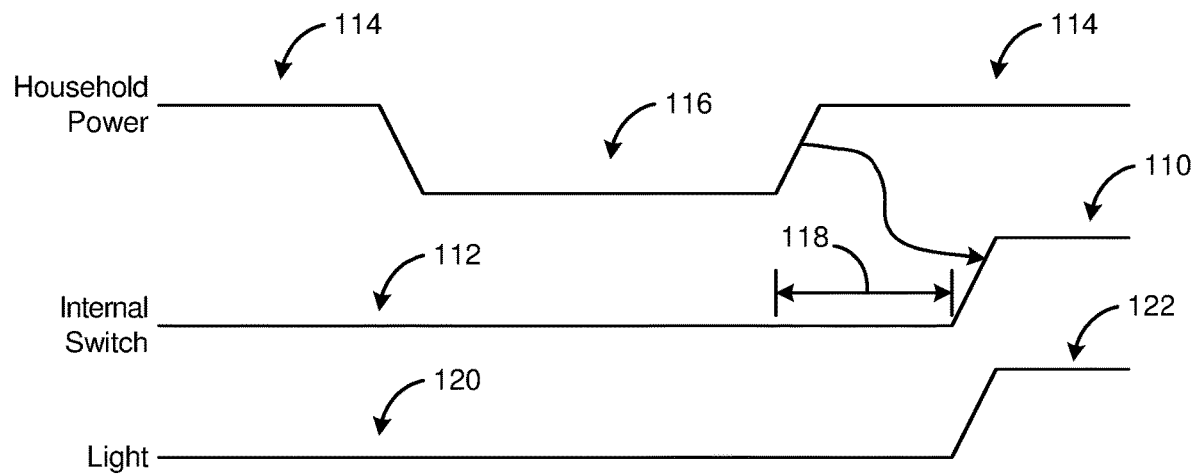
FIG. 10 is a schematic diagram illustrating one embodiment of a solution to the light-flash problem of FIG. 9.

Referring to FIGS. 9 and 10, in selected embodiments, to avoid an unwanted flash 108 of light, one or more state-control modules 28, 48 may act in certain circumstances to connect their respective internal switches (i.e., transition from a disconnected condition 112 to a connected condition 110) based on a rising edge of household power (i.e., based on household power transition from an OFF condition 116 to an ON condition 114) rather than a falling edge of household power (i.e., based on household power transition from an ON condition 114 to an OFF condition 116).

In certain circumstances (i.e., the circumstances illustrated in FIG. 9), capacitance corresponding to certain light emitters 22, 44 (e.g., capacitance built in to an high voltage LED system to provide "flickerless" or "flicker free" operation) may result in those emitters 22, 44 emitting a flash 108 of light (i.e., transitioning rapidly from an OFF condition 120 to an ON condition 122 and then back to an OFF condition 120). For example, initially, household power may be in an ON condition 114, one or more internal switches may be in a disconnected condition 112, and one or more light emitters 22, 44, may be in an OFF condition 120. A user may then turn 84 a switch 16 OFF and transition household power to an OFF condition 116. If the one or more state-control modules 28, 38 were connecting their respective internal switches based on a rising edge of household power, they would start, and within a short period of time 118 complete, the process of connecting those internal switches. Accordingly, if a transition from a disconnected condition 112 to a connected condition 110 results in one or more light emitters 22, 44 being connected with certain capacitance associated therewith, those one or more light emitters 22, 44 may emit light. However, since the capacitance may be relatively small, the stored energy may be consumed quickly and the light emitters 22, 44 may cease emitting light before the household power is restored (i.e., transitioned from an OFF condition 116 to an ON condition 114). The end result may be a noticeable and undesirable flash 108.

In the same circumstances, connecting respective internal switches based on a rising edge of household power as shown in FIG. 10 may avoid the possibility of a flash 108. For example, initially, household power may be in an ON condition 114, one or more internal switches may be in a disconnected condition 112, and one or more light emitters 22, 44, may be in an OFF condition 120. A user may then turn 84 a switch 16 OFF and transition household power to an OFF condition 116. Since the one or more state-control modules 28, 38 are disconnecting their respective internal switches based on a rising edge of household power, they would be doing nothing at this point because there has been no rising edge. Accordingly, only after the user restores household power, will the internal switches be connected. At that point, the one or more light emitters 22, 44 may have full access to household power and may operate as designed without any flash 108 and, due the capacitance, without any flickering.

Figure 11:
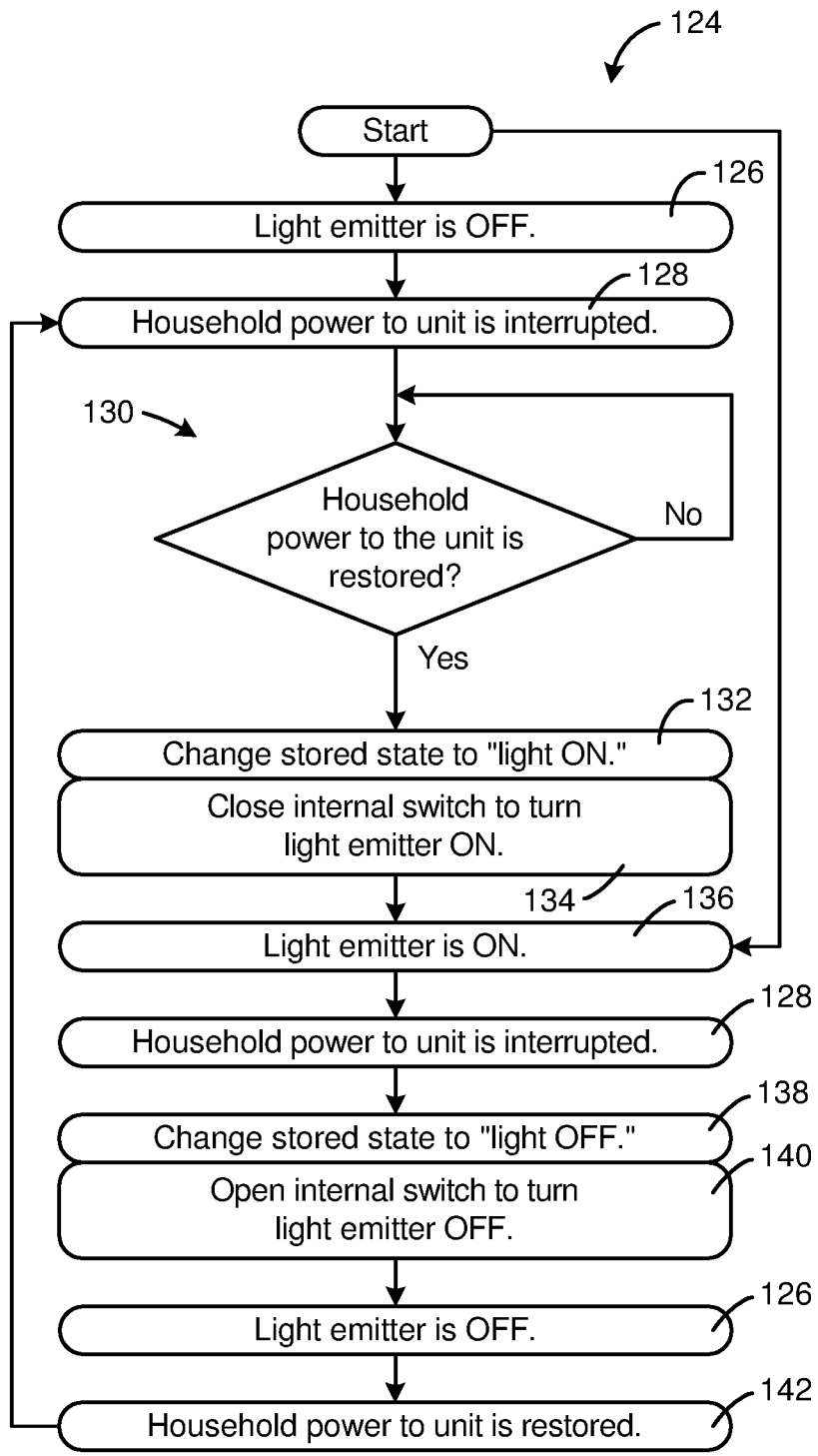
FIG. 11 is a schematic block diagram of one embodiment of a method for implementing the solutions of FIGS. 8 and 10.

Referring to FIG. 11, a method 124 in accordance with the present invention may enable one or more systems 18 in accordance with the present invention to avoid unwanted flashes 108 of light by implementing the solutions illustrated in FIGS. 8 and 10. For purposes of discussion, such a method 124 will be applied hereinbelow to a single multistate light unit 20 or to a single application unit 14. However, the method 124 may be simultaneously employed by all multistate light units 20 and/or application units 14 within a system 18.

In certain situations, as a method 124 begins, household power may be available (i.e., in an ON condition 114), but a light emitter 22, 44 may be 126 OFF. Accordingly, as the method 124 begins, an internal switch corresponding to the unit 14, 20 may be in a disconnected condition 112. At some point thereafter, a user may turn 84 a switch 16 to an OFF position. This may interrupt 128 the flow of household power to the unit 14, 20. As a result, the unit 14, 20 (e.g., a state-control module 28, 38 of a unit 20, 14) may monitor 130 the situation to determine when household hold power is restored.

The presumption may be that the household power will be shortly restored. If that presumption is incorrect in a given situation, a unit 14, 20 may persist in monitoring 130 for as long as it has stored power to do so. When the stored power is exhausted, the unit 14, 20 may cease 98 operating and reset as disclosed hereinabove when power is eventually restored in the future.

If the presumption is correct and the monitoring 130 indicates that household power has been restored, then a state-control module 28, 38 corresponding to the unit 20, 14 may change 132 the stored state to a "light ON" state and close an internal switch to turn the light emitter 22, 44 ON. Accordingly, in short order, a light emitter 22, 44 may be 136 ON.

At some point thereafter, a user may again turn 84 a switch 16 to an OFF position. This may again interrupt 128 the flow of household power to the unit 14, 20. However, rather than monitoring 130, the unit 14, 20 (e.g., a state-control module 28, 38 of a unit 20, 14) may immediately change 138 the stored state to a "light OFF" state and open the internal switch to turn the light emitter 22, 44 OFF. Accordingly, in short order, a light emitter 22, 44 may be 126 OFF.

Again the presumption may be that the household power will be shortly restored. If that presumption is incorrect in a given situation, a unit 14, 20 may persist in functioning (e.g., storing a state) for as long as it has stored power to do so. When the stored power is exhausted, the unit 14, 20 may cease 98 operating and reset as disclosed hereinabove when power is eventually restored in the future. If the presumption is correct and the household power is restored 142 in a timely manner, then the state-control module 28, 38 of the corresponding unit 20, 14 may leave the state and internal switch unchanged until a user again interrupts 128 the flow of household power. In this manner, a system 18 may repeatedly loop through the method 125 as often as desired by the user.

In certain other situations, as a method 124 begins, household power may be available (i.e., in an ON condition 114) and a light emitter 22, 44 may be 136 ON. Accordingly, as the method 124 begins, an internal switch corresponding to the unit 14, 20 may be in a connected condition 110. Thus, depending on the initial conditions, the method 124 may begin at different locations within the repeating loop.

Figure 12:
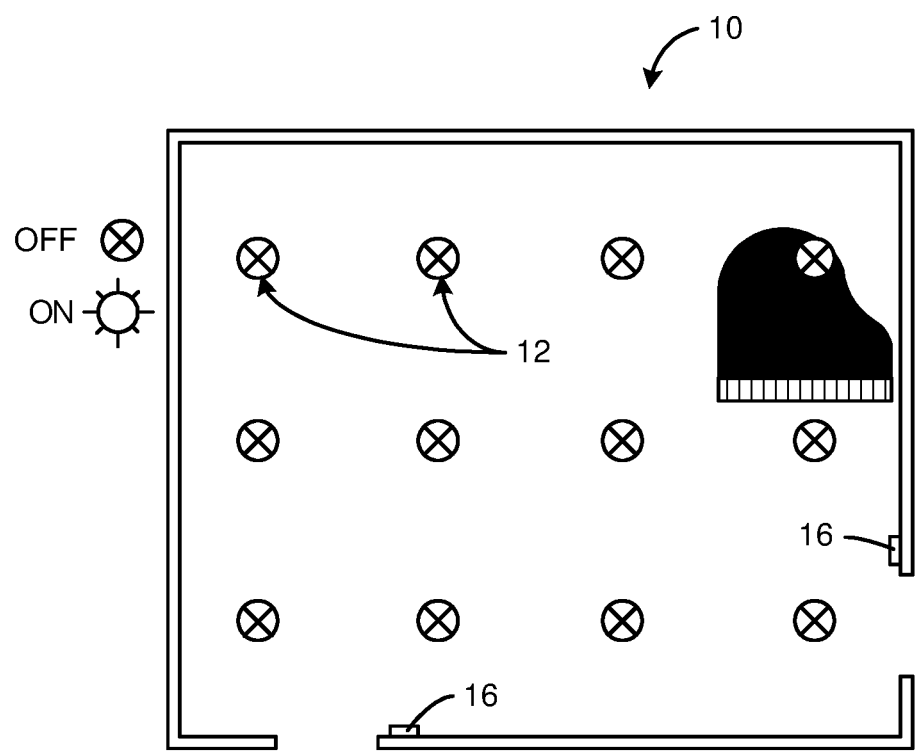
FIG. 12 is a schematic plan view of a room having all lighting sites thereof fitted with either a multistate light unit or an application unit in accordance with the present invention, wherein the light emitters corresponding to those units are all turned OFF.
Figure 13:
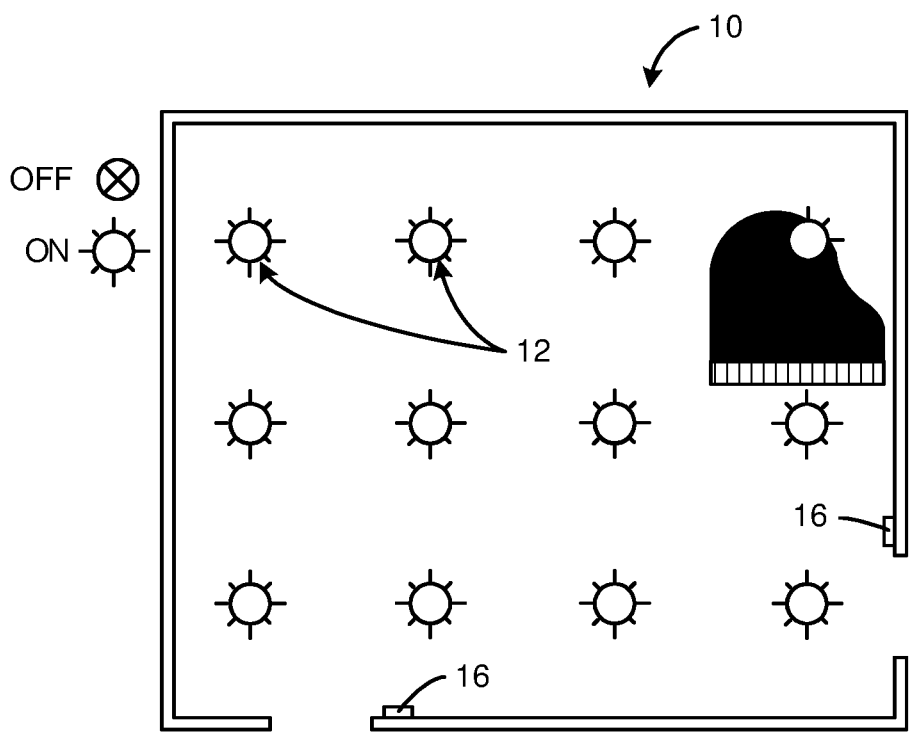

Referring to FIGS. 12 and 13, many different lighting arrangements may be obtained using systems 18 in accordance with the present invention. Moreover, a user may have a great deal of freedom in customizing a lighting arrangement and the arrangement of application units 18 to meet his or her specific wishes or requirements. For example, in selected embodiments, a room 10 may have multiple lighting sites 12 connected to household power by one or more switches 16 (e.g., two three-way switches). Each of the lighting sites 12 may have either a multistate light unit 20 or an application unit 14 having lighting functionality installed therein. Accordingly, cycling a switch 16 one time may simultaneously turn light emitters 22, 44 corresponding to each of the lighting sites 12 ON and cycling a switch 16 one time may simultaneously turn light emitters 22, 44 corresponding to each of the lighting sites 12 OFF. In such embodiments, a system 18 may be viewed as having one lighting functionality (i.e., full power lighting) that alternates between an ON state and an OFF state.

In other embodiments, a system 18 may support more than one lighting functionality. For example, a system 18 may support three lighting functionalities that each alternate between an ON state and an OFF state. A first state may correspond to full power lighting and may be accessed and/or controlled by a standalone cycle. A second state may correspond to half power lighting and may be accessed and/or controlled by a double cycle. A third state may correspond to a quarter power lighting and may be accessed and/or controlled by a triple cycle (i.e., three cycles completed within a predetermined period of time).

In such a system 18, a standalone cycle my turn all the light emitters 22, 44 ON at full power. A following standalone cycle may turn all the light emitters 22, 44 OFF. A double cycle my turn all the light emitters 22, 44 ON at half power. A following double cycle may turn all the light emitters 22, 44 OFF. A triple cycle my turn all the light emitters 22, 44 ON at quarter power. A following triple cycle may turn all the light emitters 22, 44 OFF. When all the light emitters 22, 44 are ON, but not at full power, a standalone cycle may turn all the light emitters 22, 44 to full power. When all the light emitters 22, 44 are ON, but not at half power, a double cycle may turn all the light emitters 22, 44 to half power. When all the light emitters 22, 44 are ON, but not at quarter power, a triple cycle may turn all the light emitters 22, 44 to quarter power.

In selected embodiments, functionality corresponding to one or more application units 14 may also be controlled by a number of cycles. To enable lighting functionality to be controlled independently from functionality of an application module 36, different numbers of cycles may be assigned to the different functionality. Accordingly, a wide variety of functionality may be controlled by counting cycles.

Figure 14:
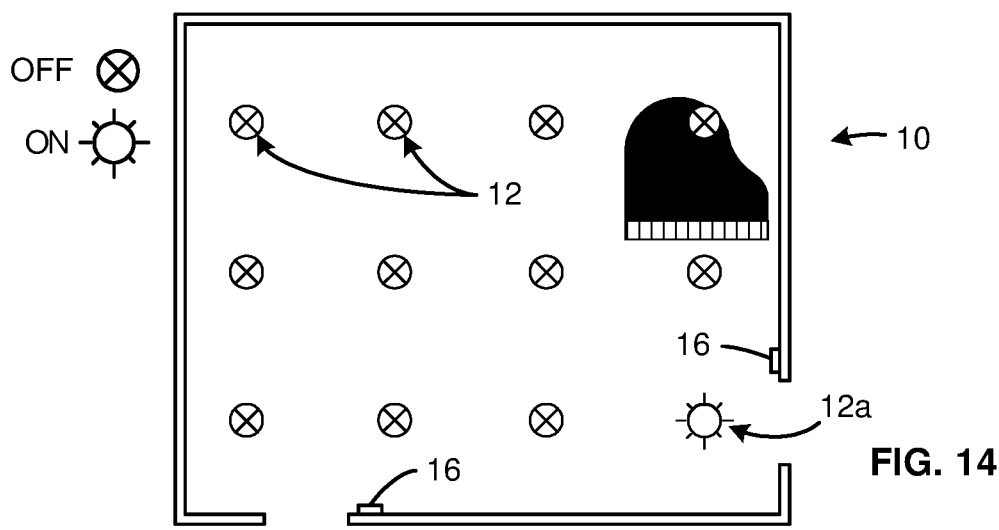
FIG. 14 is a schematic plan view of the room of FIG. 12 set up with an alternative embodiment of a system in accordance with the present invention.

Referring to FIG. 14, in selected embodiments, a room 10 may have multiple lighting sites 12 connected to household power by one or more switches 16 (e.g., two three-way switches). Most of the lighting sites 12 may have either a multistate light unit 20 or an application unit 14 having lighting functionality installed therein. The remaining few lighting sites 12a may have a standard light unit 43 installed thereat. Accordingly, cycling a switch 16 one time may simultaneously turn light emitters 22, 44 corresponding to most of the lighting sites 12 ON and cycling a switch 16 one time may simultaneously turn light emitters 22, 44 corresponding to most of the lighting sites 12 OFF. The few standard light units 43 may be ON whenever the switches 16 are ON, which may be all of the time except for brief instances when a switch 16 is being cycled. Accordingly, the standard light units 43 may be well suited for use as security lighting, safety lighting, scene lighting, or the like.

Figure 15:
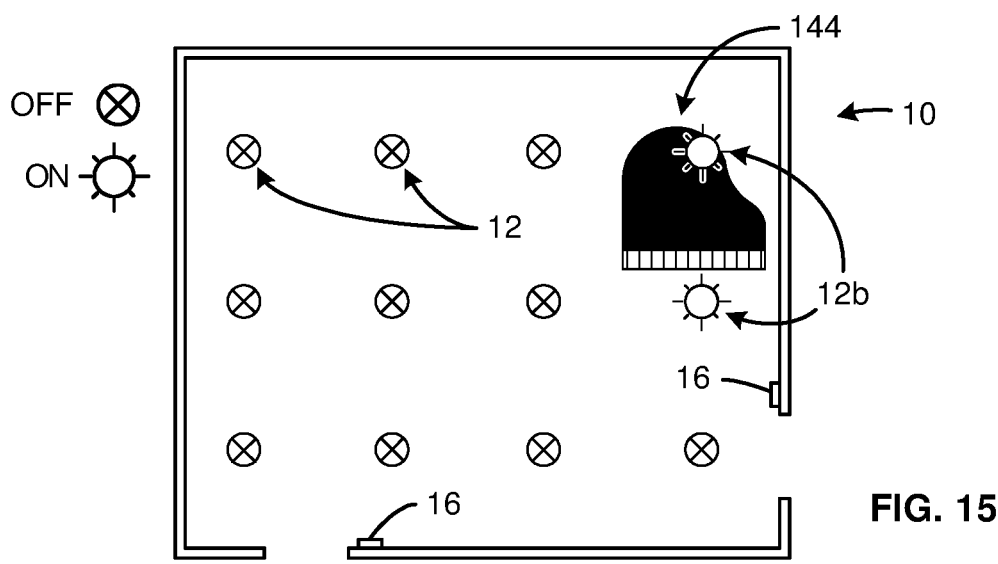
FIG. 15 is a schematic plan view of the room of FIG. 12 set up with another alternative embodiment of a system in accordance with the present invention.
Figure 16:
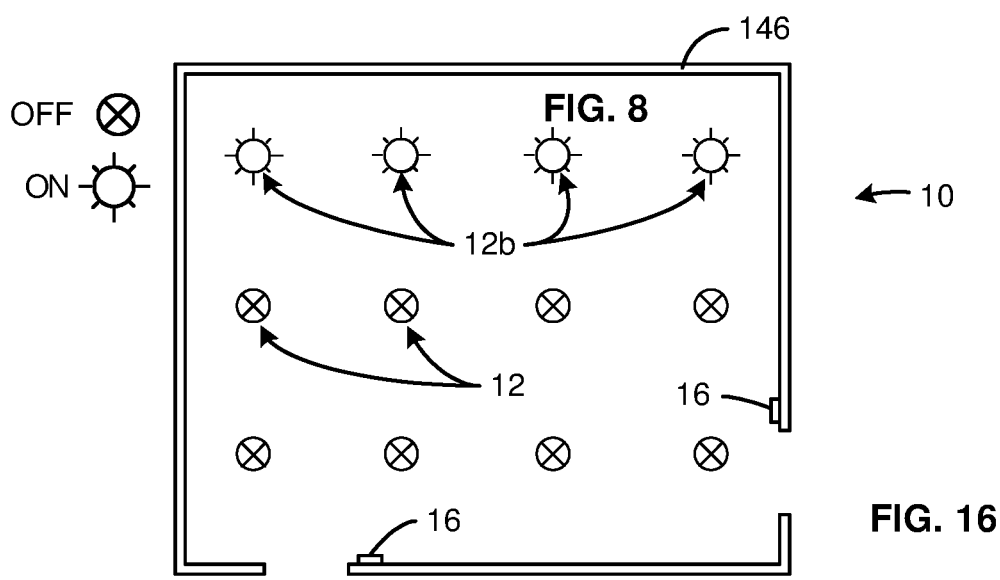
FIG. 16 is a schematic plan view of the room of FIG. 12 with the plano removed and the room set up with another alternative embodiment of a system in accordance with the present invention.

Referring to FIGS. 15 and 16, in selected embodiments, a room 10 may have multiple lighting sites 12 connected to household power by one or more switches 16 (e.g., two three-way switches). All of the lighting sites 12 may have either a multistate light unit 20 or an application unit 14 having lighting functionality installed therein. However, a few of the lighting sites 12b may be fitted with multistate light units 20 or application units 14 that are programmed differently than the others 20, 14.

For example, the majority of the multistate light units 20 or application units 14 may be programmed to respond only to a standalone cycle. Accordingly, the light emitters 22, 44 corresponding thereto may turn ON to full power with a standalone cycle and turn OFF with a standalone cycle. Other cycle counts may be ignored. The few lighting sites 12b may be fitted with multistate light units 20 or application units 14 that are programmed to respond to cycle counts other than standalone cycles.

For example, the few lighting sites 12b may be fitted with multistate light units 20 or application units 14 that support three lighting functionalities that each alternate between an ON state and an OFF state. A first state may correspond to full power lighting and may be accessed and/or controlled by a double cycle. A second state may correspond to half power lighting and may be accessed and/or controlled by a triple cycle. A third state may correspond to a quarter power lighting and may be accessed and/or controlled by a quadruple cycle (i.e., four cycles completed within a predetermined period of time). As a result, a user may control the lighting associated with the few lighting sites 12b independently from the rest of the lighting. A user may choose to locate the few lighting sites 12b in strategic places such as over a piano 144, along a wall 146 with display art, or the like.

Figure 17:
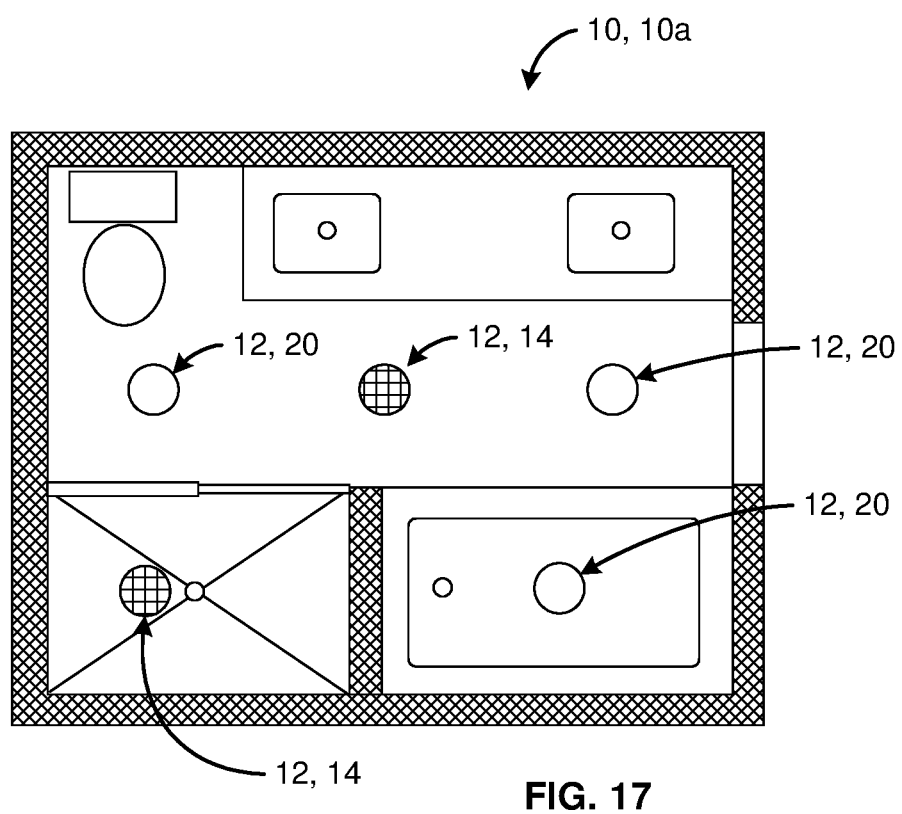
FIG. 17 is a schematic plan view of a bathroom set up with another alternative embodiment of a system in accordance with the present invention.
Figure 18:
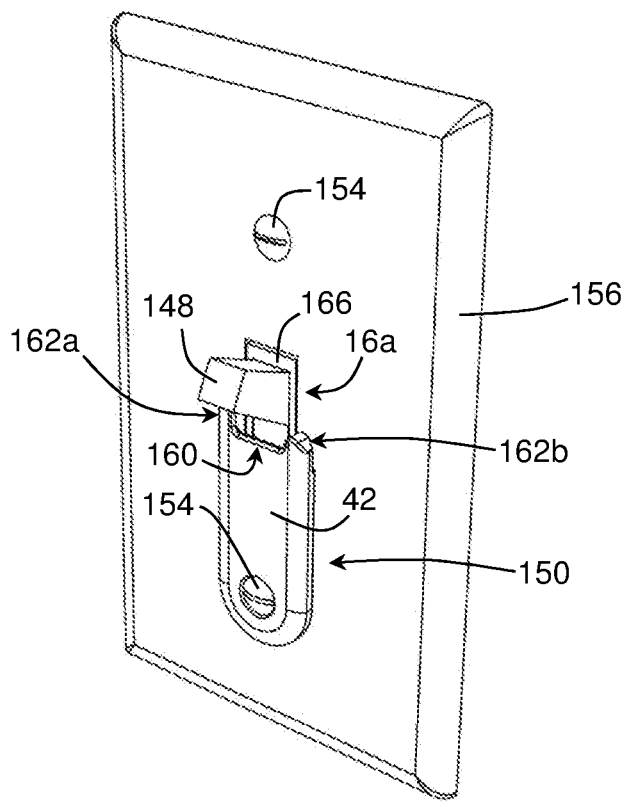
FIG. 18 is a perspective view of one embodiment of a biasing device in accordance with the present invention installed on a conventional toggle switch and in a biasing position.
Figure 19:
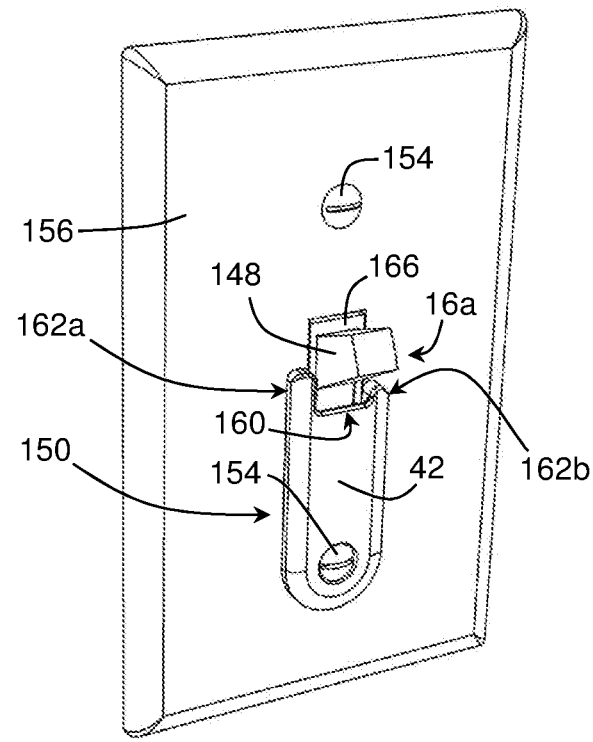
FIG. 19 is another perspective view of the biasing device of FIG. 18 installed on a conventional toggle switch and in a biasing position.
Figure 20:
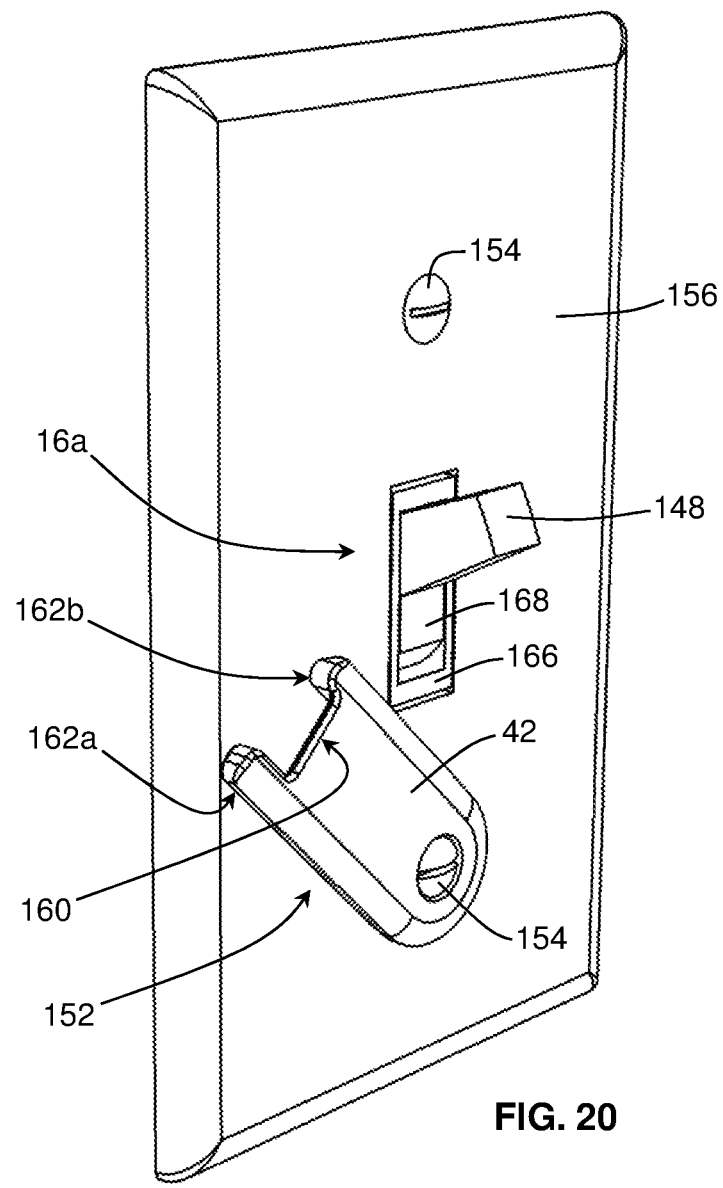
FIG. 20 is a perspective view of the biasing device of FIG. 18 installed on a conventional toggle switch and in a non-biasing position.
Figures 23, 24:
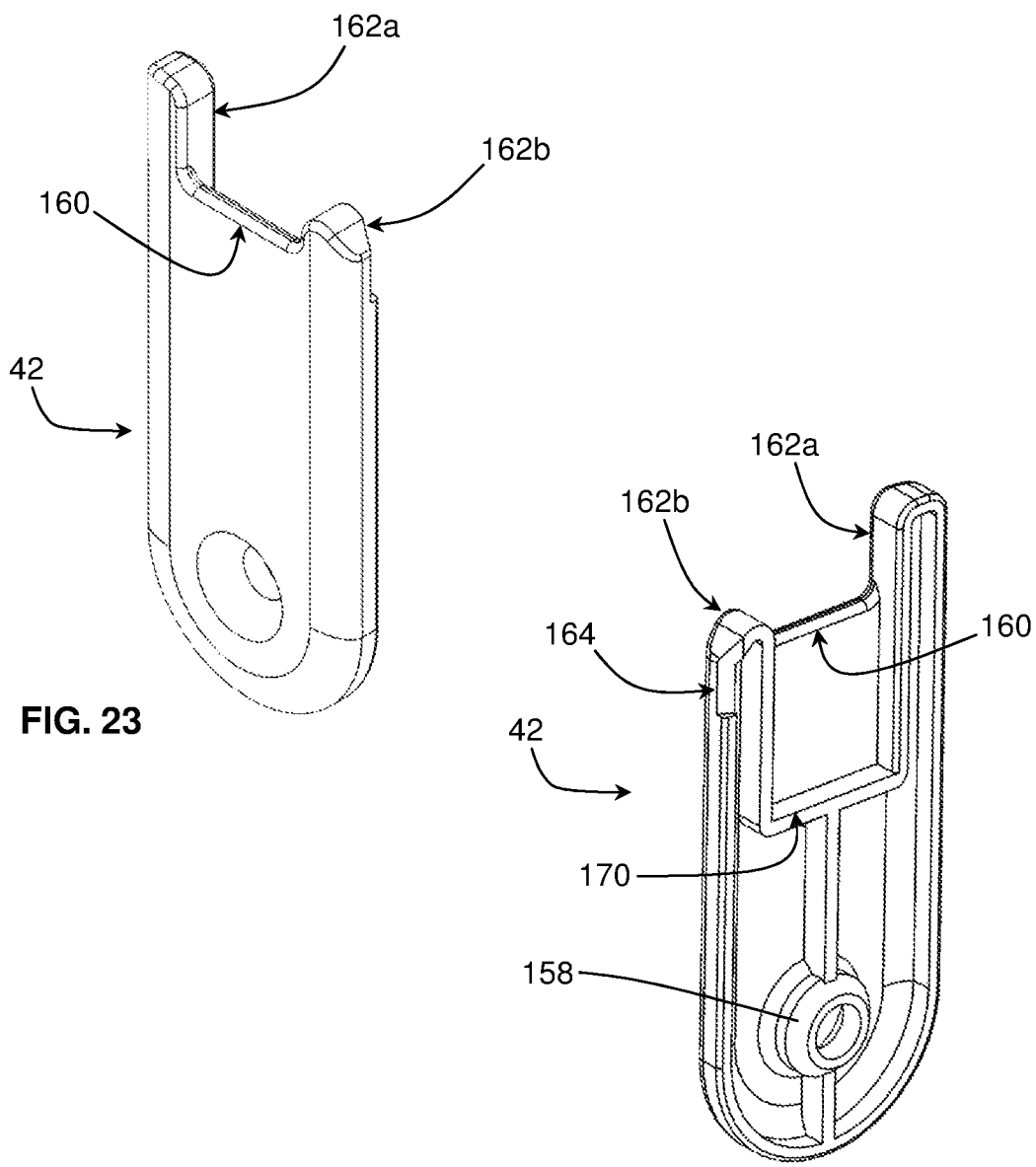
FIG. 23 is a perspective view of the biasing device of FIG. 18.
FIG. 24 is another perspective view of the biasing device of FIG. 18.
Figure 25:
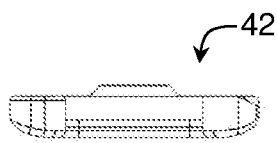
FIG. 25 is a top view of the biasing device of FIG. 18.
Figure 26:
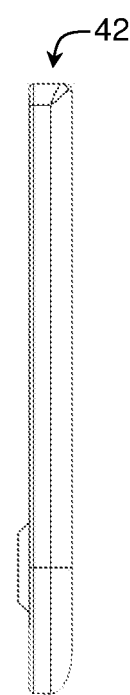
FIG. 26 is a first side view of the biasing device of FIG. 18.
Figure 27:
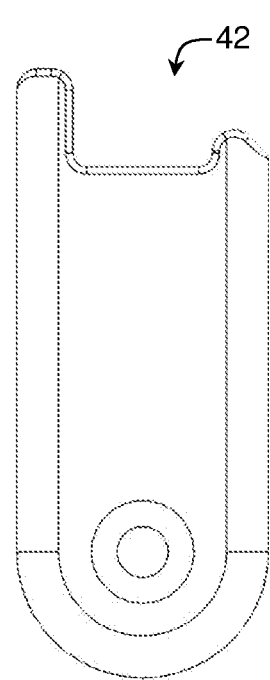
FIG. 27 is a front view of the biasing device of FIG. 18.
Figure 28:
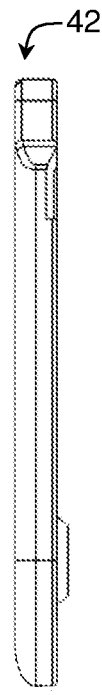
FIG. 28 is a second, opposite side view of the biasing device of FIG. 18.
Figure 29:
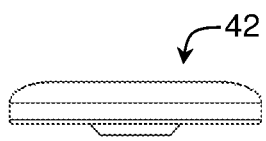
FIG. 29 is a bottom view of the biasing device of FIG. 18.
Figure 30:
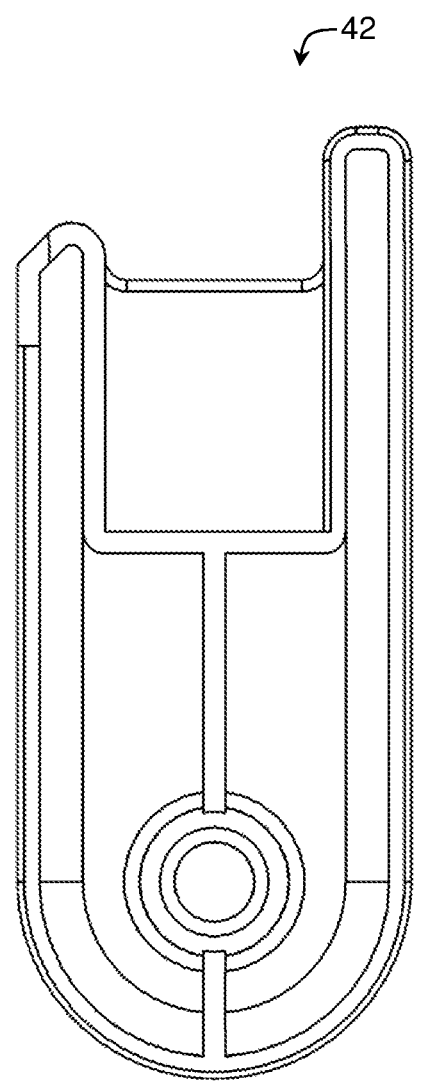
FIG. 30 is a rear view of the biasing device of FIG. 18.
Figure 31:
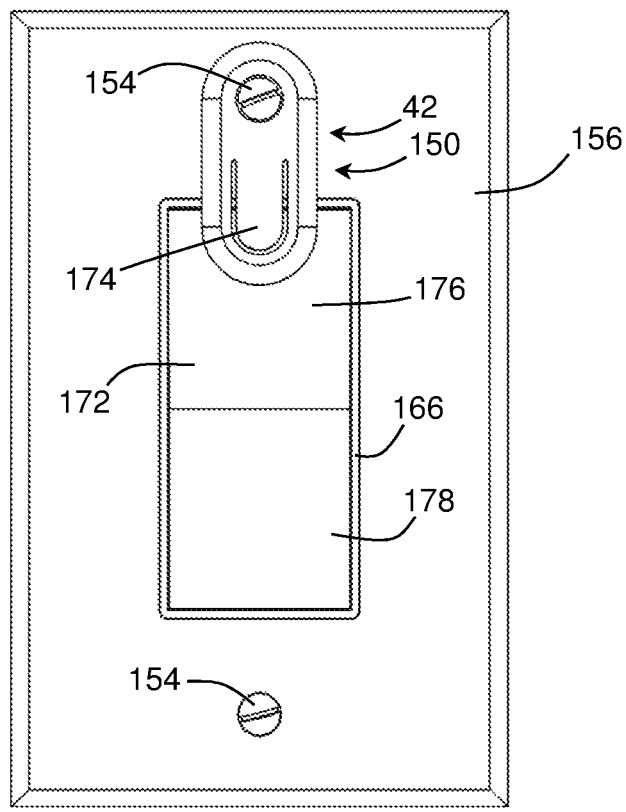
FIG. 31 is a perspective view of an alternative embodiment of a biasing device in accordance with the present invention installed on conventional decora switch and in a biasing position.
Figure 32:
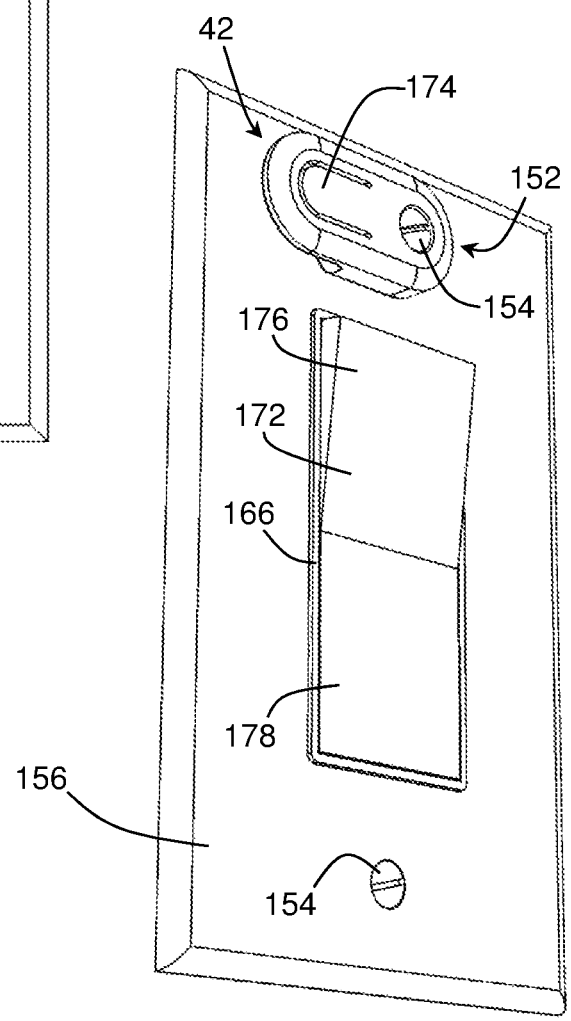
FIG. 32 is a perspective view of the biasing device of FIG. 31 installed on a conventional decora switch and in a non-biasing position.
Figure 33:
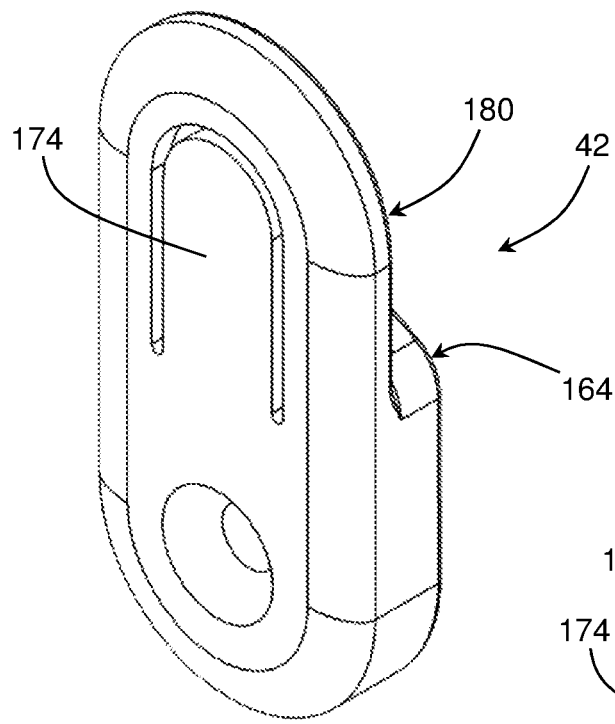
FIG. 33 is a perspective view of the biasing device of FIG. 31.
Figure 34:
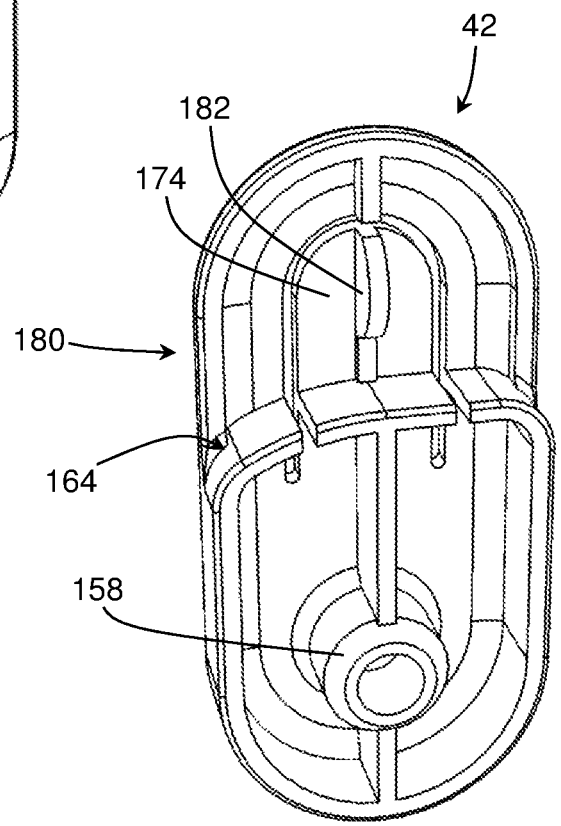
FIG. 34 is another perspective view of the biasing device of FIG. 31.
Figure 35:
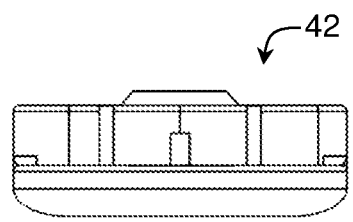
FIG. 35 is a top view of the biasing device of FIG. 31.
Figure 36:
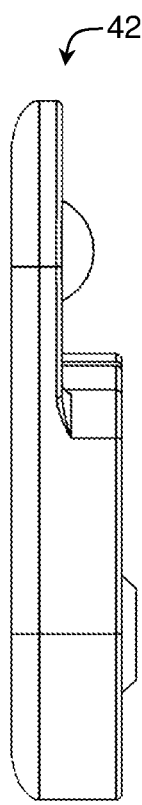
FIG. 36 is a first side view of the biasing device of FIG. 31.
Figure 37:
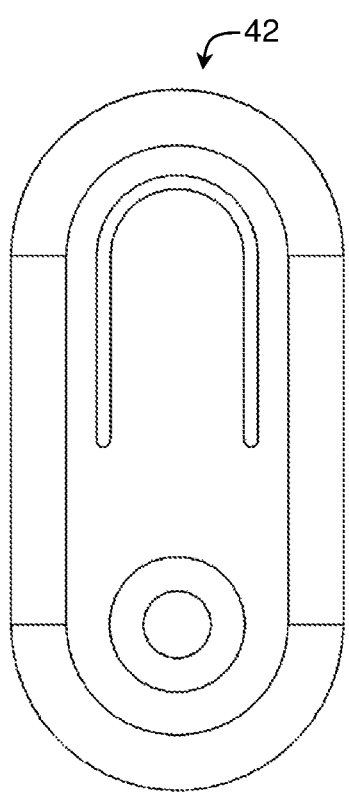
FIG. 37 is a front view of the biasing device of FIG. 31.
Figure 38:
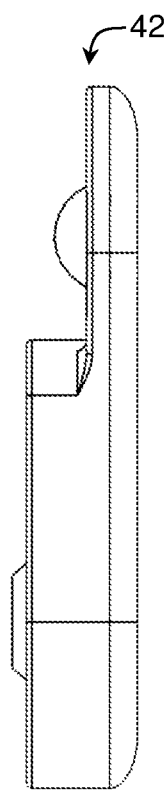
FIG. 38 is a second, opposite side view of the biasing device of FIG. 31.
Figure 39:
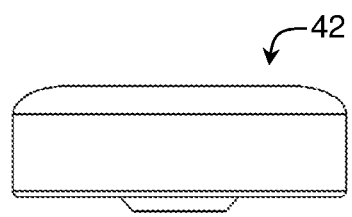
FIG. 39 is a bottom view of the biasing device of FIG. 31.
Figure 40:
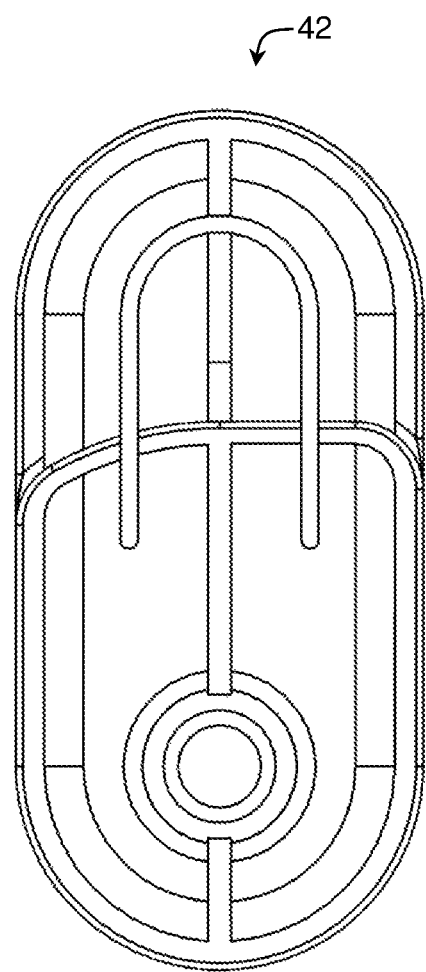
FIG. 40 is a rear view of the biasing device of FIG. 31.

Referring to FIG. 17, one embodiment of system 18 for use in a bathroom 10a is illustrated. The bathroom 10a includes five lighting sites 12. Two of the lighting sites 12 each have an application unit 14 installed therein. The other three lighting sites 12 each have a multistate light unit 20 installed therein. The two application units 14 each comprise an application module 36 providing the functionality of a virtual assistant. The two application modules 36 may be wirelessly paired so as to act as a single virtual assistant. Accordingly, a user may issue voice commands hands free as desired while showering, taking a bath, etc.

Referring to FIGS. 18-30, in selected embodiments, a switch 16 may be a standard toggle-style light switch 16a (hereinafter "toggle switch 16a"). A toggle switch 16a may control the delivery of household power by selectively moving between a first position (e.g., an ON position) and a second position (e.g., an OFF position). A toggle 148 of a toggle switch 16a may be internally biased toward the first and second positions (i.e., toward the opposing extremes of its range of motion) and out of any intermediate position therebetween.

That is, when a toggle 148 is in a first position, the internals of the toggle switch 16a may resist the toggle 148 moving out of that position. This resistance or biasing effect may continue until the toggle 148 reaches a midpoint of its range of motion. Accordingly, if a user were to release a toggle 148 before reaching the midpoint, the toggle 148 would automatically return to the first position. On the other hand, if a user moves the toggle 148 past the midpoint, the internals of the toggle switch 16a may start exert a biasing force urging the toggle on to the second position. Accordingly, if a user were to release a toggle 148 after passing the midpoint, the toggle 148 would automatically advance fully into the second position.

In selected embodiments, a biasing device 42 may take advantage of the internal biasing effect of a toggle switch 16a in order provide an automatic return of the toggle 148 to the first position when the user releases it. For example, a biasing device 42 may block a toggle 148 from reaching a midpoint of its range of motion. The toggle 148 may have clearance to move out of the first position sufficiently to open the switch 16a. A user may continue moving the toggle 148 until further motion is blocked by the biasing device 42. At that point, the user may release the toggle 148. Since the toggle 148 did not pass or even reach the midpoint, the internal biasing effect of the toggle switch 16a may cause the toggle 148 to automatically return to the first position (and, thereby, close the switch 16a).

In selected embodiments, a biasing device 42 may selectively pivot or otherwise move between a biasing position 150 and a non-biasing position 152. In a biasing position 150, a biasing device 42 may block a toggle 148 from reaching a midpoint as set forth hereinabove. In a non-biasing position 152, a biasing device 42 may be pivoted or moved out of the way so a corresponding toggle switch 16a may be free to act in a conventional manner (i.e., toggle between the first and second positions as desired by a user).

In certain embodiments, a biasing device 42 may pivot about a face-plate screw 154. That is, a face plate 156 may be applied to a toggle switch 16a. Conventionally, a face plate 14 may secure to a toggle switch 16a with two screws 154. In selected embodiments, one of those two screws 152 may be removed, a biasing member 42 may be held in alignment with the vacated screw hole, and then the face-plate screw 154 (or a slightly longer face-plate screw 154) may be reinserted and used to hold the biasing device 42 against the face plate 156. Thereafter, a biasing device 42 may pivot about the face-plate screw 154 into and out of a biasing position 150 as desired.

As noted above, a face plate 156 may be held in place with two face-plate screws 154. Either screw 154 may be used to secure a biasing device 42. The choice of which screw 154 to use may depend on which position the toggle 148 will be biased toward. For example, if a toggle 148 is to be biased toward an upper position, then a user may use the lower screw 154 to secure the biasing device 42. Conversely, if a toggle is to be biased toward a lower position, then a user may use the upper screw 154 to secure the biasing device 42.

In general, a toggle 148 in an upper position may be in the ON position. However, for switches 16 set up in three-way wiring, the ON position may be the upper position or the lower position and may change each time a different switch 16 within the system 18 is flipped. In such situations, a switch 16 may be flipped to turn one or more lights ON. Thereafter, without moving any of the switches 16, each may be set up with a biasing device 42 positioned to bias the switch 16 to that particular position, without regard to whether it is an upper or lower position.

In selected embodiments, screw apertures in a face plate 156 (i.e., apertures formed in a face plate 156 to receive face-plate screws 154) may have a countersink formed therein. This countersink may allow the heads of the face-plate screws 154 to sit flush with a face of the face plate 156. In certain embodiments, a biasing device 42 may include a cone 158 shaped to extend into (e.g., nest within) a countersink of a face plate 156. This nesting effect may facilitate a proper alignment of a biasing device 42 with respect to the face plate 156. It may also enable or support a smooth pivoting motion of the biasing device 42 with respect to a face plate 156.

In certain embodiments, a biasing device 42 may have a slot 160 formed therein. The slot 160 may be positioned to receive a toggle 148 as it moves toward the biasing device 42. The slot 160 may tend to center a biasing device 42 with respect to a toggle 148. The slot 160 may also reduce the chance that moving a toggle 148 into contact with a biasing device 42 will cause the biasing device 42 to pivot out of a proper biasing position 150.

In selected embodiments, a slot 160 may be defined by two extensions 162a, 162b that extend away from a distal end of a biasing device 42. One of the two extensions 162a may be long enough to abut a side of a toggle 148 as a biasing device 42 pivots with respect to the toggle 148. This structural interference may prevent the biasing device 42 from rotating past a proper biasing position 150. Accordingly, to reach a proper biasing position 150, a user may simply pivot a biasing device 42 (e.g., in a clockwise direction) with respect to a toggle switch 16a until the one extension 162a abuts the appropriate side of the toggle 148.

A biasing device 42 may include various features that improve its functionality or ease of use. For example, in certain embodiments, a biasing device 42 may include a chamfer 164 or ramp 164 that will enable the biasing device 42 to smoothly pivot into a biasing position 150 without catching or snagging on a bezel 166 surrounding a toggle 148, a shoulder 168 of a toggle 148, or the like. In selected embodiments, a back side of a biasing device 42 may include a cavity 170 sized and positioned to accommodate the motion of a shoulder 168 of a toggle 148 as it moves within its range of motion.

Referring to FIG. 31-40, in selected embodiments, a switch 16 may be a standard decora-style light switch 16b (hereinafter "decora switch 16b"). A decora switch 16b may control the delivery of household power by selectively moving between a first position (e.g., an ON position) and a second position (e.g., an OFF position). Like a toggle 148 of a toggle switch 16a, a paddle 172 of a decora switch 16b may be internally biased toward the first and second positions (i.e., toward the opposing extremes of its range of motion) and out of any intermediate position therebetween.

A biasing device 42 configured to bias a decora switch 16b may include a cantilever 174. When the biasing device 42 is installed, a cantilever 174 thereof may be positioned to extend over a first end 176 of a paddle 172. With the first end 176 flush with the surrounding bezel 166, the paddle 172 may be in a first position. As the raised second end 178 of the paddle 172 is pressed in by a user, the first end 176 may move outward and deflect the cantilever 174. The cantilever 174 may be sufficiently flexible to permit the paddle 172 to pivot sufficiently to open the switch 16b. For example, the cantilever 174 may be sufficiently flexible to permit the paddle 172 to pivot completely into the second position. However, when a user releases the paddle 172, the resiliency of the cantilever 174 may be sufficient to cause it to return to its neural position and take the first end 176 of the paddle 172 with it. Accordingly, the resiliency of the cantilever 174 may return the paddle 172 to the first position.

As noted above, a face plate 156 may be held in place with two face-plate screws 154. Either screw 154 may be used to secure a biasing device 42 configured for use with a decora switch 16b. The choice of which screw 154 to use may depend on which position the paddle 172 will be biased toward. For example, if a paddle 172 is to be biased toward a position where the first (upper) end 176 thereof is flush with the surrounding bezel 166, then a user may use the upper screw 154 to secure the biasing device 42. Conversely, if a paddle 172 is to be biased toward a position where the second (lower) end 178 thereof is flush with the surrounding bezel 166, then a user may use the lower screw 154 to secure the biasing device 42.

In selected embodiment, a portion 180 of a biasing device 42 that extends over an end 176, 178 of a paddle 172 may have an undercut that provides clearance for the paddle 172 to move (e.g., pivot outward) as desired. However, a cantilever 174 may include a projection 182 that extends into the undercut. Accordingly, as a paddle 172 pivots into the undercut, it may only contact (and, therefore, only deflect) the cantilever 174.

Figure 41:
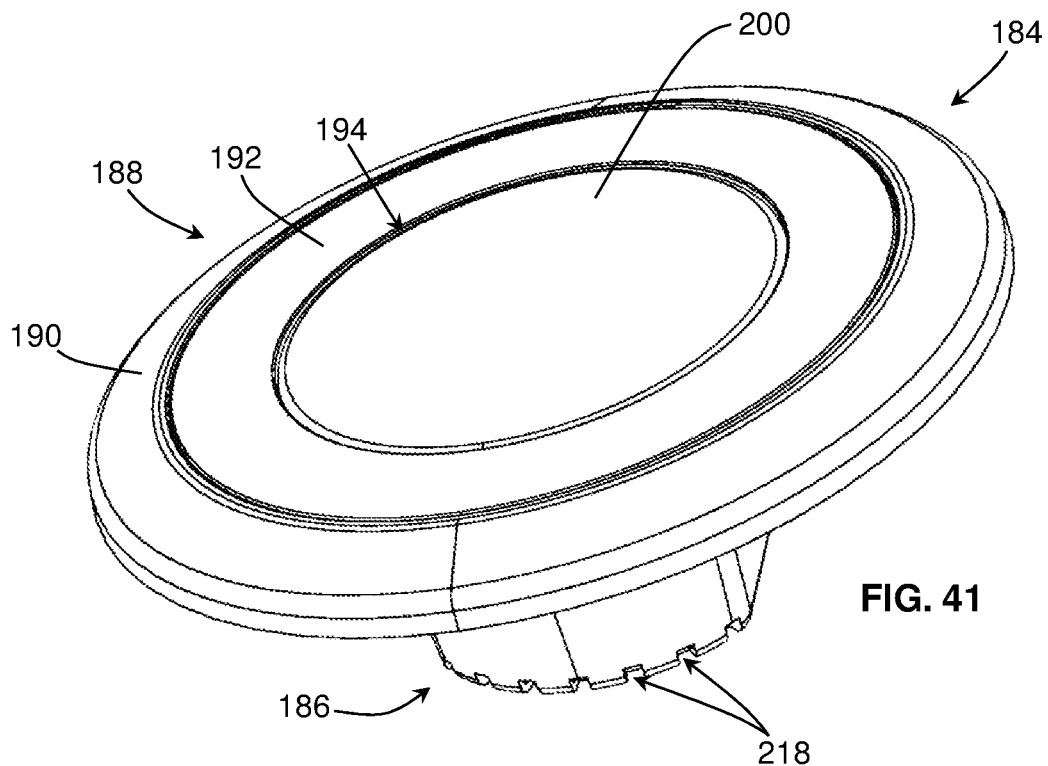
FIG. 41 is a perspective view of one embodiment of a housing for an application unit in accordance with the present invention configured for installation within a recessed light housing or "can"
Figure 42:
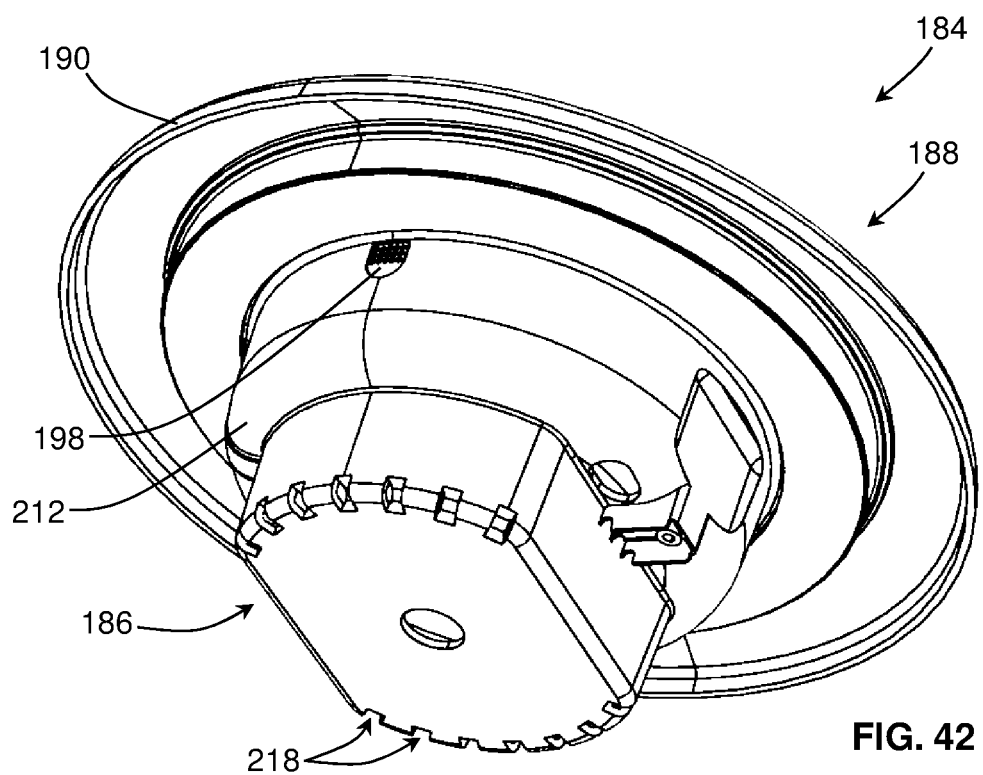
FIG. 42 is another perspective view of the housing of FIG. 41.
Figure 43:
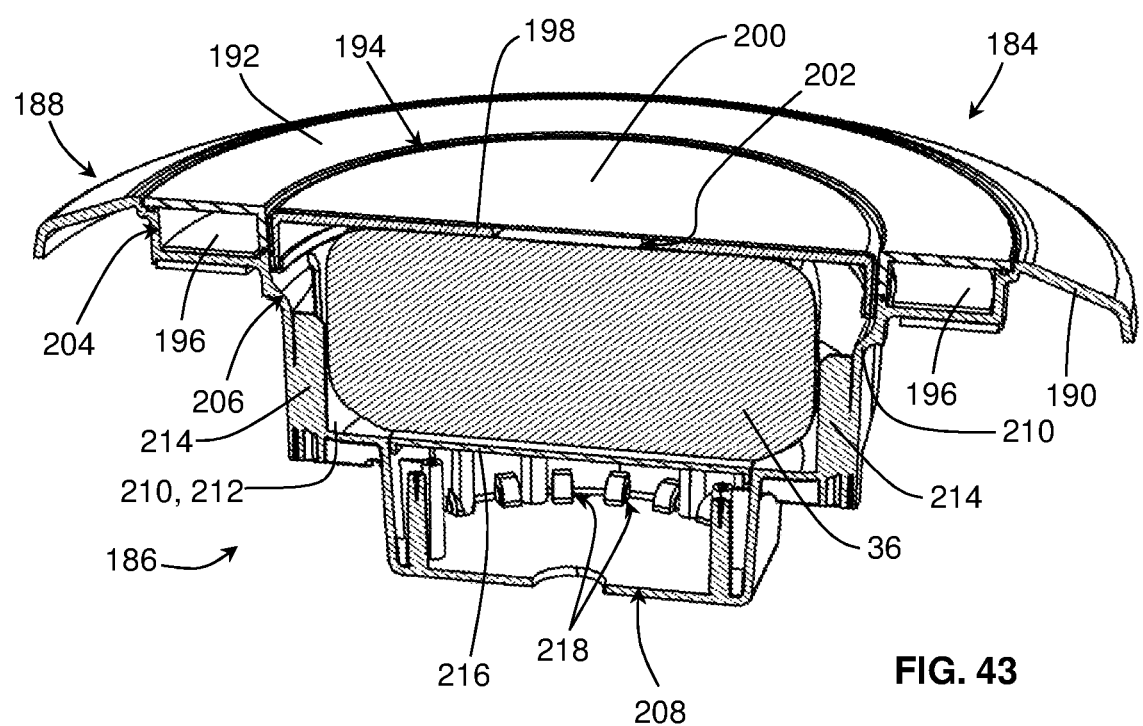
FIG. 43 is a cross-sectional view of the housing of FIG. 41 with an application module and a board for a light emitter positioned therewithin.

Referring to FIG. 41-43, in certain embodiments, an application unit 14 may be configured to be mounted within a standard recessed lighting housing or "can." In such embodiments, an application unit 14 may include its own housing 184. A housing 184 of an application unit 14 may include an interior portion 186 shaped and sized to extend into a standard recessed lighting housing. A housing 184 may also include an exterior portion 188 that may be visible after the application unit 14 is installed in a standard recessed lighting housing.

In selected embodiments, an exterior portion 188 of a housing 184 may include a bezel 190, light diffusing lens 192, cover 194, or the like or a combination or sub-combination thereof. A bezel 190 may form an outer extreme of an exterior portion 188 and may circumferentially encircle all the other components 192, 194 thereof. A bezel 190 may provide an aesthetically pleasing interface between an application unit 14 and a surrounding ceiling surface.

A light diffusing lens 192 may be positioned interior to (i.e., inboard of) a bezel 190 and exterior to (i.e., outboard of) a cover 194. In selected embodiments, a light diffusing lens 192 may have an annular shape. A light diffusing lens 192 may diffuse light generated by a light emitter 44 as it passes therethrough. In certain embodiments, a light emitter 44 may comprise an arrangement of LEDs (e.g., a ring of LEDs) mounted to an annular circuit board 196 that is positioned just below or axially interior to a light diffusing lens 192.

In selected embodiments, a cover 194 may form a center (e.g., a circular center) of an exterior portion 188 of a housing 184 of an application unit 14. A cover 194 may assist in securing an application module 36 in place. For example, in certain embodiments, an application module 36 may comprise a commercially available virtual assistant such as an AMAZON ECHO DOT. In such embodiments, a cover 194 may assist in securing the virtual assistant within an interior portion 186 of a housing 184. A cover 194 may also protect the virtual assistant from water, dust, or the like that may be found in a corresponding room 10.

In certain embodiments, a cover 194 may comprise a structural element 198 and a protective barrier 200. A structural element 198 may hold an application module 36 in place. In selected embodiments, a structural element 198 may have one or more apertures 202 extending therethrough (e.g., extending axially therethrough). Such apertures 202 may enable sound to more easily pass to and from an application module 36. A protective barrier 200 may extend over a structural element 198 and prevent unwanted material from passing through one or more apertures 202 in a structural element 198. For example, a protective barrier 200 may be a cloth or thin plastic layer or membrane that is readily permeable to sound, but substantially impermeable to water droplets, water vapor, dust, or the like or a combination or sub-combination thereof.

An interior portion 186 of a housing 184 may define one or more compartments or spaces therewithin for housing and/or mounting various parts of an application unit 14. For example, a housing 184 may define a space 204 for securing a light emitter 44, a space 206 for receiving an application module 36, and a space 208 for various other components of an application unit 14. In selected embodiments, a space 206 for receiving an application module 36 may be shaped and have sufficient clearance to direct sound emanating from an application module 36 out into a room 10. For example, the wall 210 of the housing 184 that defines a space 206 for an application module 36 (e.g., the wall that encircles an application module 36) may be or form a sound reflector with a round bottom corner 212 that guides the sound energy produced by the application module 36 out through a cover 194 and into a corresponding room 10. Various fins 214 may extend into a gap between an application module and a wall 210 in order to center an application module 36 within the space 206.

In selected embodiments, a space 208 for various other components of an application unit 14 may be positioned axially below a space 206 for an application module 36. A cover 216 may divide the two spaces 206, 208 and protect one or more electronic components housed within the lower space 208. In certain embodiments, one or more printed circuit boards may be mounted within the lower space 208. The printed circuit boards and the corresponding electrical connections and hardware thereof may form various components of an application unit 14 including an application power supply 34, state power supply 45, switch detector 46, state-control module 48, or the like or a combination or sub-combination thereof. In certain embodiments, a housing 184 may have a plurality of vents 218 formed therein to facilitate air circulation and cooling of electronic components with the lower space 208.

An application unit 14 may include various interface devices that assist in connecting the application unit 14 within a recessed light housing. For example, an application unit 14 may include (or be sold with) cabling and/or one or more wiring harnesses that interconnect a power source within a recessed light housing (e.g., an E26 socket), an application module 36, a light emitter 44, a printed circuit board (e.g., a board supporting or forming an application power supply 34, state power supply 45, switch detector 46, state-control module 48, or the like), or the like or a combination or sub-combination thereof. In selected embodiments, when an application module 36 is an independent commercially available product like a virtual assistant, a wiring harness may be used in place of a power supply provided with the product.

In selected embodiments, a multistate light unit 20 may resemble an application unit 14 as disclosed and illustrated in FIG. 41-43 above. A primary difference may be that a multistate light unit 20 may not include an application module 36 and the components 34, 194, specifically associated therewith. Accordingly, an exterior portion 188 of a multistate light unit 20 may simply include a bezel 190 and a central light diffusing lens 192 (e.g., a circular rather than annular light diffusing lens 92). A space 206 for an application module 36 may become a space 206 for a light emitter 22.

The present invention may be embodied in other specific forms without departing from its spirit or essential characteristics. The described embodiments are to be considered in all respects only as illustrative, and not restrictive. The scope

What is claimed and desired to be secured by United States Letters Patent is:

1. A method comprising:
    selecting a manual switch having a biasing device retrofitted thereto, the manual switch being mounted to a wall, selectively movable between a first position and a second position, and connected to control delivery of household power to one or more light units;
    manually moving, the manual switch out of the first position and into the second position or toward the second position after the selecting;
    interrupting, by the manual switch as a result of the moving, the delivery of household power to the one or more light units;
    manually releasing the manual switch after the interrupting;
    providing, by the biasing device after the releasing, an immediate automatic return of the manual switch to the first position;
    restoring, as a result of the immediate automatic return of the manual switch to the first position, the delivery of household power to the one or more light units;
    sensing, by a first light unit of the one or more light units, the interrupting of the delivery of household power; and
    disconnecting, by the first light unit in response to the sensing, a light emitter of the first light unit from household power such that the light emitter emits no light after the restoring.

2. The method of claim 1, wherein the first light unit further comprises a first energy-storage device and a state-control module, the state-control module performing the disconnecting in response to the sensing.

3. The method of claim 2, further comprising delivering, by the first energy-storage device, electrical power to state-control module from the interrupting until the restoring.

4. The method of claim 3, wherein the first light unit further comprises an application unit.

5. The method of claim 4, wherein the application unit comprises at least one of a speaker and a microphone.

6. The method of claim 5, wherein the application unit further comprises a second energy-storage device.

7. The method of claim 6, further comprising delivering, by the second energy-storage device, electrical power to the at least one of the speaker and the microphone from the interrupting until the restoring such that the at least one of the speaker and the microphone operates without interruption.

8. The method of claim 7, further comprising
    executing, after the providing, a second moving of the manual switch out of the first position and into the second position or toward the second position;
    executing, by the manual switch as a result of the second moving, a second interrupting of the delivery of household power to the one or more light units;
    executing, after the second interrupting, a second releasing of the manual switch; and
    providing, by the biasing device after the second releasing, a second immediate automatic return of the manual switch to the first position.

9. The method of claim 8, further comprising effecting, as a result of the second immediate automatic return of the manual switch to the first position, a second restoring of the delivery of household power to the one or more light units.

10. The method of claim 9, further comprising sensing, by the first light unit, the second restoring of the delivery of household power.

11. The method of claim 10, further comprising connecting, by the first light unit in response to the sensing the second restoring, the light emitter to household power.

12. A system comprising:
    an electrical unit comprising a state-control module and a load;
    a manual switch controlling delivery of household power to the electrical unit by selectively moving between a first position and a second position;
    a biasing device mounted proximate the manual switch, the biasing device biasing the manual switch to the first position such that, after the manual switch is manually moved out of the first position and into the second position or toward the second position, the biasing device facilitates an immediate automatic return of the manual switch to the first position when the manual switch is released;
    the electrical unit wherein the state-control module (1) uses at least one of an interruption of the delivery of household power to the electrical unit and a restoration of the delivery of household power to the electrical unit as a control signal, (2) connects the load to household power in response to the control signal when a current state is disconnection between the load and the household power, and (3) disconnects the load from household power in response to the control signal when the current state is connection between the load and household power.

13. The system of claim 12, wherein the load is a light emitter.

14. The system of claim 13, wherein the state-control module disconnects the light emitter from household power when the current state is a connection between the load and household power and an interruption in the delivery of household to the electrical unit occurs.

15. The system of claim 14, wherein the state-control module connects the light emitter to the household power when the current state is disconnection between the load and household power and a restoration of the delivery of household power to the electrical unit occurs.

16. The system of claim 13, wherein the electrical unit further comprises an application unit comprising:
    at least one of a speaker and a microphone; and
    an energy-storage device connected to provide electrical power to the at least one of the speaker and the microphone when the delivery of household power to the electrical unit is interrupted.

* * * * *